(12) United States Patent
Loukus et al.

(10) Patent No.: US 10,434,568 B2
(45) Date of Patent: Oct. 8, 2019

(54) THERMAL ISOLATION SPRAY FOR CASTING ARTICLES

(71) Applicant: REL, Inc., Calumet, MI (US)

(72) Inventors: Josh E. Loukus, Calumet, MI (US); Adam R. Loukus, Calumet, MI (US); Travis Pennala, Lyon, MI (US); Luke Luskin, Hubbell, MI (US)

(73) Assignee: LOUKUS TECHNOLOGIES, INC., Calumet, MI (US)

( * ) Notice: Subject to any disclaimer, the term of this patent is extended or adjusted under 35 U.S.C. 154(b) by 0 days.

(21) Appl. No.: 13/836,001

(22) Filed: Mar. 15, 2013

(65) Prior Publication Data

US 2013/0269901 A1 Oct. 17, 2013

Related U.S. Application Data

(60) Provisional application No. 61/623,532, filed on Apr. 12, 2012, provisional application No. 61/690,727, filed on Jul. 3, 2012.

(51) Int. Cl.
| | |
|---|---|
| *B22D 27/04* | (2006.01) |
| *B22C 9/00* | (2006.01) |
| *B22D 17/00* | (2006.01) |
| *B22D 19/00* | (2006.01) |
| *B22D 19/02* | (2006.01) |
| *B22D 19/08* | (2006.01) |
| *B22D 19/14* | (2006.01) |

(Continued)

(52) U.S. Cl.
CPC ............... *B22D 27/04* (2013.01); *B22C 9/00* (2013.01); *B22D 17/00* (2013.01); *B22D 17/203* (2013.01); *B22D 17/2023* (2013.01); *B22D 17/22* (2013.01); *B22D 19/0081* (2013.01); *B22D 19/02* (2013.01); *B22D 19/08* (2013.01); *B22D 19/14* (2013.01); *C04B 30/02* (2013.01); *C04B 2111/00525* (2013.01); *C04B 2111/00577* (2013.01); *Y10T 428/24926* (2015.01)

(58) Field of Classification Search
CPC .... B22D 27/04; B22D 17/00; B22D 19/0081; B22D 19/08; B22D 19/14; B22C 9/00
USPC ........... 164/97, 122, 91, 120, 271, 284, 312; 156/308.2; 428/210
See application file for complete search history.

(56) References Cited

U.S. PATENT DOCUMENTS

| | | |
|---|---|---|
| 2,426,988 A | 9/1947 | Dean |
| 3,230,056 A | 1/1966 | Norbert et al. |

(Continued)

FOREIGN PATENT DOCUMENTS

| | | |
|---|---|---|
| CA | 1128255 | 7/1982 |
| CA | 1189283 | 6/1985 |

(Continued)

OTHER PUBLICATIONS

English Abstract for DE19937798 (A1), Mar. 1, 2001, 2 pages.

(Continued)

*Primary Examiner* — Kevin P Kerns
*Assistant Examiner* — Steven S Ha
(74) *Attorney, Agent, or Firm* — Device Patent LLC

(57) ABSTRACT

Embodiments provide methods, apparatuses and systems for depositing a thermal insulator coating onto a desired surface of a mold cavity or insert or preform. Embodiments also provide casting methods using a thermal insulator coating.

19 Claims, 27 Drawing Sheets

(51) Int. Cl.
  *C04B 30/02* (2006.01)
  *B22D 17/20* (2006.01)
  *B22D 17/22* (2006.01)
  *C04B 111/00* (2006.01)

(56) References Cited

U.S. PATENT DOCUMENTS

| | | | |
|---|---|---|---|
| 3,387,646 A | 6/1968 | Lauth | |
| 3,472,308 A | 10/1969 | Lauth | |
| 3,622,404 A | 11/1971 | Thompson | |
| 3,702,279 A | 11/1972 | Ardary et al. | |
| 3,736,448 A | 5/1973 | Hebel et al. | |
| 3,741,820 A | 6/1973 | Hebel | |
| 3,911,997 A | 10/1975 | Sugazawa | |
| 4,136,455 A | 1/1979 | Owsen | |
| 4,232,091 A | 11/1980 | Grimshaw et al. | |
| 4,254,621 A * | 3/1981 | Nagumo | 60/282 |
| 4,264,052 A | 4/1981 | Radtke et al. | |
| 4,283,847 A | 8/1981 | May | |
| 4,393,100 A | 7/1983 | Potter | |
| 4,404,262 A | 9/1983 | Watmough | |
| 4,416,174 A | 11/1983 | Owsen | |
| 4,425,411 A * | 1/1984 | Textor et al. | 428/702 |
| 4,546,048 A | 10/1985 | Guenther | |
| 4,575,394 A | 3/1986 | Nixon | |
| 4,650,775 A | 3/1987 | Hill et al. | |
| 4,651,630 A | 3/1987 | Zeilinger et al. | |
| 4,664,704 A | 5/1987 | Dohnomoto et al. | |
| 4,667,727 A | 5/1987 | Barlow et al. | |
| 4,679,493 A | 7/1987 | Munro et al. | |
| 4,715,422 A | 12/1987 | Tommis et al. | |
| 4,751,205 A | 6/1988 | Hill et al. | |
| 4,770,707 A | 9/1988 | Smith | |
| 4,799,531 A | 1/1989 | Yamamoto et al. | |
| 4,802,425 A | 2/1989 | Dickson | |
| 4,899,800 A | 2/1990 | Gallerneault et al. | |
| 4,921,669 A | 5/1990 | Vetter et al. | |
| 4,968,359 A | 11/1990 | Hebel et al. | |
| 4,995,444 A | 2/1991 | Jolly | |
| 5,033,532 A * | 7/1991 | Aoyama | 164/72 |
| 5,047,289 A | 9/1991 | Tsuchiya et al. | |
| 5,089,072 A | 2/1992 | Carson | |
| 5,102,745 A | 4/1992 | Tatarchuk et al. | |
| 5,242,512 A | 9/1993 | Bagley et al. | |
| 5,252,152 A | 10/1993 | Seror | |
| 5,373,630 A | 12/1994 | Lucier et al. | |
| 5,373,632 A | 12/1994 | Lucier et al. | |
| 5,394,930 A | 3/1995 | Kennerknecht | |
| 5,415,219 A * | 5/1995 | Wiedenmann | B22C 9/061 164/138 |
| 5,421,087 A | 6/1995 | Newkirk et al. | |
| 5,427,853 A | 6/1995 | Powell et al. | |
| 5,511,603 A | 4/1996 | Brown et al. | |
| 5,520,861 A | 5/1996 | Powell et al. | |
| 5,524,696 A | 6/1996 | Osborne et al. | |
| 5,553,658 A | 9/1996 | Cornie | |
| 5,569,422 A | 10/1996 | Astier et al. | |
| 5,588,477 A | 12/1996 | Sokol et al. | |
| 5,657,795 A | 8/1997 | Sawko et al. | |
| 5,679,041 A | 10/1997 | Sokol et al. | |
| 5,693,274 A | 12/1997 | Kim | |
| 5,700,409 A | 12/1997 | Corry | |
| 5,755,272 A | 5/1998 | Mortensen et al. | |
| 5,836,682 A | 11/1998 | Blach et al. | |
| 5,980,792 A | 11/1999 | Chamlee | |
| 5,983,973 A | 11/1999 | Cornie | |
| 6,190,031 B1 | 2/2001 | Blach et al. | |
| 6,196,711 B1 | 3/2001 | Blach et al. | |
| 6,227,693 B1 | 5/2001 | Blach et al. | |
| 6,293,680 B1 | 9/2001 | Bruns | |
| 6,318,442 B1 | 11/2001 | Cornie | |
| 6,375,877 B2 | 4/2002 | Lauf et al. | |
| 6,733,628 B2 | 5/2004 | Dinwoodie et al. | |
| 7,025,491 B2 | 4/2006 | Blach et al. | |
| 7,048,034 B2 | 5/2006 | Vandermeer et al. | |
| 7,137,675 B1 | 11/2006 | Simula et al. | |
| 7,160,503 B2 | 1/2007 | Weaver | |
| 7,175,722 B2 | 2/2007 | Walker | |
| 7,270,471 B2 | 9/2007 | Blach | |
| 7,284,897 B2 | 10/2007 | Blach | |
| 7,360,386 B2 | 4/2008 | Bair | |
| 7,425,090 B2 | 9/2008 | Blach | |
| 7,481,144 B2 | 1/2009 | Simula et al. | |
| 7,594,453 B2 | 9/2009 | Blach | |
| 7,654,726 B2 | 2/2010 | Blach | |
| 9,180,511 B2 | 11/2015 | Loukus et al. | |
| 2002/0088599 A1 | 7/2002 | Davis et al. | |
| 2003/0019604 A1 | 1/2003 | Ishiduka | |
| 2003/0034145 A1 | 2/2003 | Ishiduka et al. | |
| 2003/0097752 A1 | 5/2003 | Shirk et al. | |
| 2003/0141032 A1 | 7/2003 | Singer et al. | |
| 2004/0035547 A1 | 2/2004 | Grether | |
| 2004/0089435 A1 | 5/2004 | Wang | |
| 2004/0163791 A1 | 8/2004 | Hara et al. | |
| 2005/0026818 A1 | 2/2005 | Fatheree et al. | |
| 2005/0037215 A1 | 2/2005 | Ishiduka et al. | |
| 2005/0100724 A1 | 5/2005 | Seargeant | |
| 2005/0183909 A1 | 8/2005 | Rau et al. | |
| 2005/0217950 A1 | 10/2005 | Jolley et al. | |
| 2005/0284602 A1 | 12/2005 | Kaba et al. | |
| 2006/0021731 A1 | 2/2006 | Strangman | |
| 2006/0283920 A1 | 12/2006 | Chitty | |
| 2007/0031164 A1 | 2/2007 | Ota | |
| 2007/0040005 A1 | 2/2007 | Iordache et al. | |
| 2007/0044443 A1 | 3/2007 | Nixdorf et al. | |
| 2007/0064222 A1 | 3/2007 | Schlachter | |
| 2007/0137827 A1 * | 6/2007 | Vogt et al. | 164/113 |
| 2008/0092725 A1 | 4/2008 | Simula et al. | |
| 2008/0105339 A1 | 5/2008 | Walker | |
| 2008/0119559 A1 | 5/2008 | Weissbach et al. | |
| 2008/0119560 A1 | 5/2008 | Old et al. | |
| 2008/0259717 A1 | 10/2008 | Blach | |
| 2009/0040863 A1 | 2/2009 | Blach | |
| 2009/0135625 A1 | 5/2009 | Yang et al. | |
| 2009/0274003 A1 | 11/2009 | Blach | |
| 2009/0309252 A1 | 12/2009 | Schuetz et al. | |
| 2009/0309262 A1 | 12/2009 | Mccullough et al. | |
| 2009/0311541 A1 | 12/2009 | Wood et al. | |
| 2009/0312174 A1 | 12/2009 | Mccullough et al. | |
| 2010/0001231 A1 | 1/2010 | Loukus et al. | |
| 2010/0067320 A1 | 3/2010 | Blach et al. | |
| 2013/0269902 A1 | 10/2013 | Loukus et al. | |
| 2016/0059305 A1 | 3/2016 | Loukus et al. | |

FOREIGN PATENT DOCUMENTS

| | | | |
|---|---|---|---|
| CA | 1294754 | | 1/1992 |
| DE | 2431536 | A1 | 1/1976 |
| DE | 19937798 | A1 | 3/2001 |
| EP | 0151952 | | 8/1985 |
| EP | 0230192 | A1 | 7/1987 |
| EP | 271222 | | 6/1988 |
| GB | 1031587 | A * | 6/1966 |
| GB | 1240301 | | 7/1971 |
| GB | 2079401 | A | 1/1982 |
| GB | 2106433 | A | 4/1983 |
| JP | 48102724 | | 12/1973 |
| JP | 58015743 | A | 1/1983 |
| JP | 62202941 | | 12/1987 |
| JP | 63036959 | | 3/1988 |
| JP | 63260655 | | 10/1988 |
| JP | 63268551 | | 11/1988 |
| JP | 01299752 | | 12/1989 |
| JP | 03057551 | | 3/1991 |
| JP | 05177336 | | 7/1993 |
| JP | 63260655 | | 10/1998 |
| JP | 11077240 | | 3/1999 |
| JP | 11267817 | | 10/1999 |
| JP | 2003112242 | | 4/2003 |
| JP | 2008188620 | | 8/2008 |
| WO | 0056481 | A1 | 9/2000 |

(56) References Cited

FOREIGN PATENT DOCUMENTS

| WO | 2013155131 | 10/2013 |
|---|---|---|
| WO | 2013155132 | 10/2013 |

OTHER PUBLICATIONS

English Abstract for European Publication No. 0230192 A1, Jul. 29, 1987, 1 page.
English Abstract for Japanese Publication No. 58015743, published Jan. 29, 1983, 1 page.
International Search Report and Written Opinion for PCT/US2013/035890, dated Nov. 29, 2013, 17 pages.
International Search Report and Written Opinion for PCT/US2013/035892, dated Nov. 29, 2013, 16 pages.
Communication Pursuant to Rules 161(1) and 162 EPC, for European Patent Application No. 13718691.2, dated Dec. 16, 2014 (2 pages).
"Communication Pursuant to Rules 161(1) and 162 EPC", for European Patent Application No. 13718692.0, dated Dec. 16, 2014 (2 pages).
"Final Office Action", for U.S. Appl. No. 13/840,423, dated Jan. 16, 2015 (24 pages).
"International Preliminary Report on Patentability", for PCT Application No. PCT/US2013/035890, dated Oct. 23, 2014 (11 pages).
"International Preliminary Report on Patentability", for PCT Application No. PCT/US2013/035892, dated Oct. 23, 2014 (11 pages).
"Morgan ThermalCeramics Kaowool Blanket S/Kaowool Blanket SZr", Datasheet Code 5-7-12 E, MSDS Code 104-9-EURO Reach, copyright 2009 (3 pages).
"Non-Final Office Action", for U.S. Appl. No. 13/840,423, dated Jun. 23, 2014 (22 pages).
"Response to Non-Final Office Action", for U.S. Appl. No. 13/840,423, dated Dec. 23, 2014 (15 pages).
"Response to Restriction Requirement", for U.S. Appl. No. 13/840,423, dated Apr. 25, 2014 (2 pages).
"Restriction Requirement", for U.S. Appl. No. 13/840,423, dated Feb. 26, 2014 (7 pages).
Notice of Allowance for U.S. Appl. No. 13/840,423, dated Jul. 7, 2015 (19 pages).
Response to Communication Pursuant to Rules 161 and 162 EPC for European Patent Application No. 13718691.2, filed Jun. 22, 2015 (33 pages).
Response to Communication Pursuant to Rules 161(1) and 162 EPC for European Patent Application No. 13718692.0, filed Jun. 23, 2015 (34 pages).
Response to Office Action for Canadian Patent Application No. 2,870,311, filed with CIPO Aug. 2, 2016 (4 pages).
Response to Office Action for Canadian Patent Application No. 2,871,759, filed with the Canadian Patent Office Jul. 27, 2016 (9 pages).
"Boron Nitride, BN Ceramic Properties", Accuratus, 2013, retrieved from http://accuratus.com/boron.html on Jun. 20, 2016, 4 pages.
Dycote Product Manual, Foseco, May 2011, retrieved from http://www.foseco.com/fileadmin/_migrated/content_uploads/DYCOTE_e_.pdf on Jun. 20, 2016, 30 pages.
Non Final Office Action for U.S. Appl. No. 14/935,068, dated Jan. 25, 2016 (20 pages).
Office Action for Canadian Patent Application No. 2,870,311 dated Dec. 4, 2015 (6 pages).
Office Action for Canadian Patent Application No. 2,870,311, dated May 2, 2016 (4 pages).
Office Action for Canadian Patent Application No. 2,870,759 dated Apr. 27, 2016 (5 pages).
Office Action for Canadian Patent Application No. 2,870,759 dated Dec. 3, 2015 (4 pages).
Response to Office Action for Canadian Patent Application No. 2,870,311 filed with CIPO Mar. 4, 2016 (35 pages).
Response to Office Action for Canadian Patent Application No. 2870759, filed with CIPO Mar. 3, 2016 (35 pages).
"Squeeze-Rite® 424 Squeeze Casting Lubricant", Technical Data Sheet, Cross Chemical Co., Inc., Apr. 5, 2012, retrieved from http:www.crosschemical.com/images/contentImages/file/TechSheets/SQUEEZE-RITER%20424.pdf on Jun. 20, 2016, 1 page.
Supplemental Response to Office Action for Canadian Patent Application No. 2,870,759 filed with CIPO Mar. 7, 2016 (13 pages).
"Non Final Office Action," for Japanese Patent Application No. 2015-505862, dated Sep. 30, 2016 (16 pages) with English Translation.
"Non Final Office Action," for Japanese Patent Application No. 2015-505863, dated Sep. 30, 2016 (14 pages) with English translation.
Office Action for Canadian Patent Application No. 2,870,311, dated Sep. 15, 2016 (4 pages).
Communication Pursuant to Article 94(3) EPC for European Patent Application No. 13718691.2 dated Nov. 4, 2016 (4 pages).
Communication Pursuant to Article 94(3) EPC for European Patent Application No. 13718692.0 dated Nov. 16, 2016 (4 pages).
Final Office Action for U.S. Appl. No. 14/935,068, dated Nov. 18, 2016 (39 pages).
Office Action for Canadian Patent Application No. 2,870,759 dated Jan. 19, 2017 (3 pages).
Office Action for Canadian Patent Application No. 2,870,759 dated Sep. 7, 2016 (3 pages).
Response to Communication Pursuant to Article 94(3) EPC for European Patent Application No. 13718691.2 filed with the EPO Dec. 6, 2016 (27 pages).
Response to Communication Pursuant to Article 94(3) EPC for European Patent Application No. 13718692.0, filed Feb. 2, 2017 (20 pages).
Response to Office Action for Canadian Patent Application No. 2,870,311, filed with CIPO Mar. 14, 2017 (10 pages).
Response to Office Action for Canadian Patent Application No. 2,870,759, filed with CIPO Feb. 13, 2017 (9 pages).
Response to Office Action for Canadian Patent Application No. 2870759, filed with CIPO Dec. 7, 2016 (18 pages).

* cited by examiner

FIG. 1

102 — Providing a ceramic fiber material

104 — Combining the ceramic fiber material with a liquid

106 — Mixing the combination of ceramic fiber material and liquid under high shear

402 — Depositing a first thermal insulator coating onto a surface of the mold cavity 404 — Depositing a first molten material into the mold cavity in contact with the surface bearing the first thermal insulator coating 406 — Depositing a second thermal insulator coating onto a surface of the first molten material 408 — Depositing a second molten material into the mold cavity in contact with the first molten material surface bearing the second thermal insulator coating 410 — Optionally depositing a third thermal insulator coating onto a surface of the second molten material in the mold cavity 412 — Optionally applying pressure to the mold cavity FIG. 39
FIG. 40
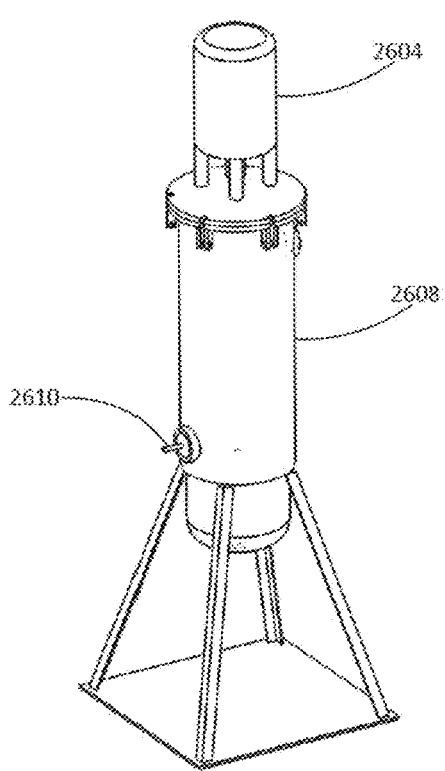
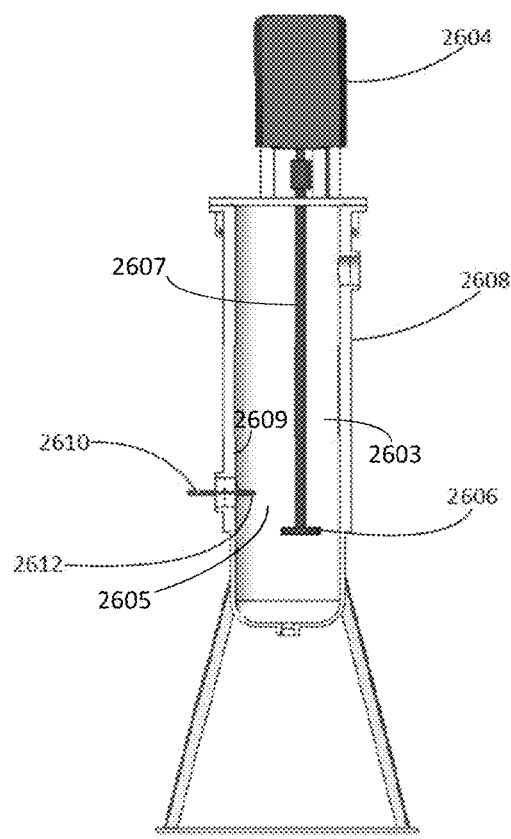

THERMAL ISOLATION SPRAY FOR CASTING ARTICLES

PRIORITY

This application claims priority to U.S. provisional patent application No. 61/623,532, filed Apr. 12, 2012, entitled Thermal Isolation for Casting Articles, and to U.S. provisional patent application No. 61/690,727, filed Jul. 3, 2012, entitled MMC with Enhanced Thermal Isolation. This application is also related to U.S. patent application Ser. No. 13/840,423, filed concurrently herewith, entitled Thermal Isolation for Casting Articles. Each of the referenced applications are hereby incorporated by reference herein in their entirety.

STATEMENT REGARDING FEDERALLY SPONSORED RESEARCH OR DEVELOPMENT

This invention was made with government support under contract DE-AR0000253 awarded by the U.S. Department of Energy. The government has certain rights in the invention.

BACKGROUND

Casting is an old and well-known art in which liquefied materials are poured or injected into a mold which has a cavity of a desired shape. The liquefied materials are then allowed to solidify to create a cast article. Metal casting is one type of casting in which molten metals are introduced into a mold cavity at high temperatures and then allowed to solidify as the metals cool. The rate and pattern of cooling can affect the solidification process can directly affect the structure of the final cast article. For example, in some cases portions of a casting may begin to solidify at many different locations, leading to multidirectional solidification patterns within the casting. In other cases, premature cooling or cooling at undesired rates can result in undesirable microstructures within the casting or may clog or otherwise block portions of a mold cavity resulting in an unfinished or partial casting.

Solidification of a molten material within a mold cavity most frequently begins when the molten material first contacts the side walls or other inner surfaces of the mold cavity. Because molten materials are usually much hotter than the mold itself, heat quickly escapes from the molten material into the mold upon first contact. Once the material first contact the mold wall, solidification can spread rapidly through the molten material throughout the cavity. For example, molten metals exhibit an extremely high rate of heat loss and once solidification begins, an entire amount of molten metal within a mold can freeze almost instantaneously. The period of time extending from the first introduction of the molten material until complete solidification is often referred to as the dwell time. As will be appreciated, dwell times can be extremely short for molten materials, especially for molten metals, and sometimes may only last for a few seconds or even less than a second (e.g., milliseconds).

In some cases, it can be helpful to extend the dwell time of a molten material. For example, lengthening the dwell time may ensure adequate time for filling a mold cavity before solidification is complete or may promote the growth of desirable grain patterns in the solidifying material. In addition, a longer dwell time may facilitate additional activities during the casting process. As an example, when casting composite materials, extending the dwell time can allow more flexibility in positioning inserts, preforms, and other composite materials within the casting before solidification is complete.

Past efforts to extend dwell time include a few different approaches. Some have tried to increase dwell time by minimizing the temperature difference between surface of the mold cavity and the molten material being introduced into the mold. Some efforts included heating the mold to a temperature closer to that of the molten material. Other efforts included lowering the temperature of the molten material to a temperature closer to that of the molten material. While these efforts have been somewhat helpful, they have not been practical because increasing the temperature of the mold can consume large amounts of energy and may be inherently limited by the melting point of the mold material.

SUMMARY

Some embodiments of the invention provide a method for casting an article. The method comprises spray-depositing a thermal insulator coating onto a surface of a mold cavity, and introducing a molten material into the mold cavity and in contact with the thermal insulator coating. In the present embodiments, the molten material within the mold cavity remains in a molten state for a predetermined dwell time.

In certain embodiments, the invention provides a method for casting an article. The method comprises spray-depositing a thermal insulator coating onto a surface of a preform or insert, positioning the preform or insert into a mold cavity, and introducing a molten material into the mold cavity and in contact with the thermal insulator coating. In the present embodiments, the thermal insulator coating isolates the preform or insert from the molten material for a predetermined dwell time.

Certain embodiments of the invention provide a method for casting an article. In the present embodiments, the method includes: i) identifying a surface x and a surface y in a mold cavity (the surface x is a surface desiring to have a longer isolation time from molten material than the surface y), ii) spray-depositing a first thermal insulator coating onto the surface x, and iii) spray-depositing a second thermal insulator coating onto the surface y. In the present embodiments, the first thermal insulator coating preferably is thicker than the second thermal insulator coating.

In some embodiments, the invention provides a system for applying a coating onto a surface of a mold cavity or a casting insert or a casting preform. The system includes a mixing vessel, a pump, and a spray applicator. The spray applicator has a spray nozzle with concentric inner and outer flow paths. In the present embodiments, the system preferably is configured such that: i) the pump moves a fibrous coating mixture comprising liquid and fibers from the mixing vessel, to the spray nozzle apparatus, through the inner flow path, and out of the spray nozzle, while simultaneously ii) a gas flow is sprayed through the outer flow path and out of the spray nozzle.

Some embodiments of the invention provide a method of applying a thermal insulator coating onto a surface of a mold cavity or a casting insert or a casting preform. In the present embodiments, the method involves spraying a fibrous coating mixture onto the mold cavity or the casting insert or the casting preform so as to form the thermal insulator coating. Preferably, the thermal insulator coating includes fibers and has (e.g., bounds or defines) internal thermally insulative gas spaces.

These and various other features and advantages will be apparent from a reading of the following detailed description.

BRIEF DESCRIPTION OF THE DRAWINGS

The following drawings illustrate particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 1 is a flow diagram illustrating a method of manufacturing a thermal insulator coating according to an embodiment.

FIG. 12 is a flow diagram illustrating a method for casting an article using a thermal insulator coating according to another embodiment.

FIG. 39 is a schematic perspective view of a mixing vessel according to an embodiment.

FIG. 40 is a schematic sectional front view of the mixing vessel of FIG. 40.

DETAILED DESCRIPTION

Figure 2:
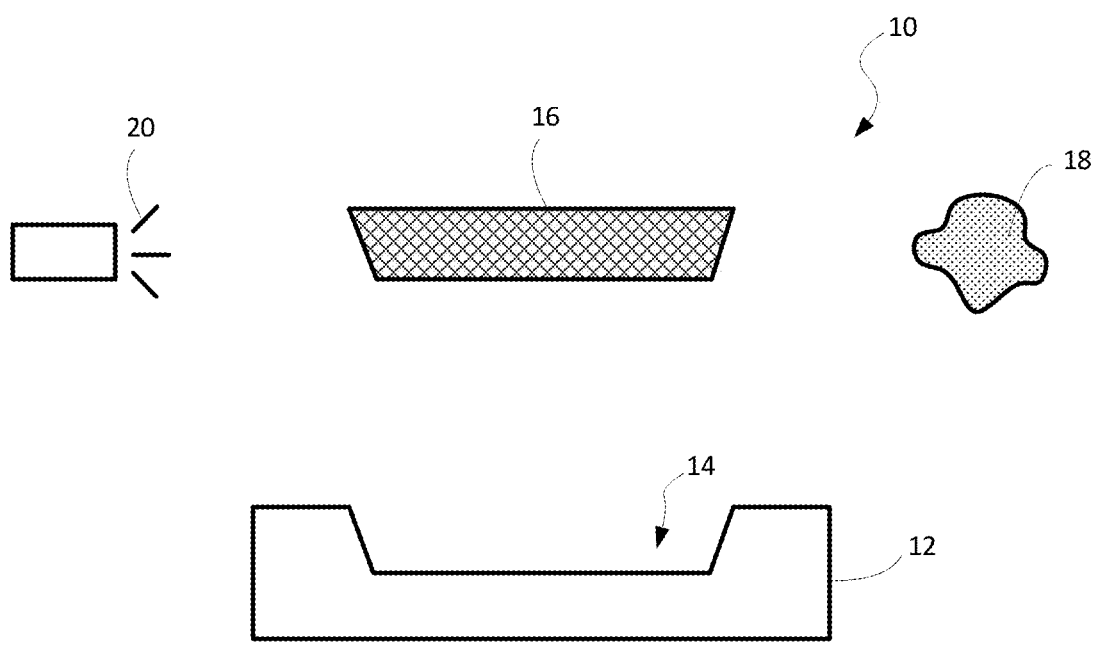
FIG. 2 is a schematic representation of a casting system according to an embodiment.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Embodiments described herein are generally related and applicable to casting processes, including metal casting. Many examples described herein are related to or in various ways address heat transfer from the molten material that is introduced into a mold cavity. For example, some embodiments discuss heat transfer from molten materials into the surrounding mold cavity walls, shot sleeves, shot tips, and/or other parts of different kinds of molds. Also, some embodiments discuss heat transfer from molten material into various preforms and/or inserts within a composite casting. Some embodiments are directed to changing heat transfer properties through the use of insulating materials.

In addition, some embodiments are directed to controlling and/or changing the behavior of molten materials as they approach surfaces within the mold cavity such as the surfaces of inserts, preforms, and other objects within the mold cavity as well as the inner walls of the mold cavity itself. Also, some embodiments discuss materials that may be used to affect heat transfer within the casting process, and some embodiments describe thermally insulating materials that can be useful for casting processes. Some embodiments describe methods for making or manufacturing thermally insulating materials that can be used to address heat transfer in a casting process. Some embodiments describe methods for using some types of insulating materials within different casting processes, as well as systems that are provided to practice the methods. Of course, it should be appreciated that the embodiments described herein are examples of different products, articles, systems, and/or methods, and are not meant to limit the scope of possible embodiments or their application.

FIG. 1 is a flow diagram illustrating a method 100 of manufacturing a thermal insulator coating composition according to an embodiment. The method 100 generally starts by providing 102 a ceramic fiber material at step 102 and combining the ceramic fiber material with a liquid at step 104. At step 106, the method includes mixing the combination of ceramic fiber material and liquid under high shear.

The ceramic fiber material can include a number of different types of ceramic fiber materials. In some cases, the ceramic fiber material includes a mixture of ceramic fibers. In some embodiments, the ceramic fiber material includes ceramic fibers from a polycrystalline fiber blanket, such as the Saffil LD mat. In other embodiments, the ceramic fiber material includes ceramic fibers from a refractory ceramic fiber blanket, such as the Kaowool mat. Other commercial sources for ceramic fibers cab include Carbon Fiber, Nextel Fiber and 3M Fibers.

The liquid can also include a number of different materials. In some cases, the liquid comprises, consists essentially of or consists of water. In some embodiments, the liquid comprises, consists essentially of or consists of water and a release agent. The release agent can generally be any agent that has increased lubricity such that it helps to release a solidified, cast article from a mold cavity. In some cases, the release agent can include polymer, wax, oil, ceramic, talc and/or graphite. Some molten materials are prone to sticking or even soldering to the mold cavity. As such, when using such sticky molten materials, it can be desirable to include a release agent in the liquid.

In certain embodiments, the liquid comprises, consists essentially of or consists of water and a release agent in a water-to-release agent ratio of between about 4:1 to about 50:1 measured on a volumetric basis. The ratio can vary depending on the type of release agent used and/or the type of molten material used.

In some embodiments, the invention provides a system for applying a coating onto a surface of a mold cavity or a casting insert or a casting preform. The system generally includes a mixing vessel 2608, a pump 2704, and a spray applicator 2802. Reference is made to FIGS. 39-44.

Figure 42:
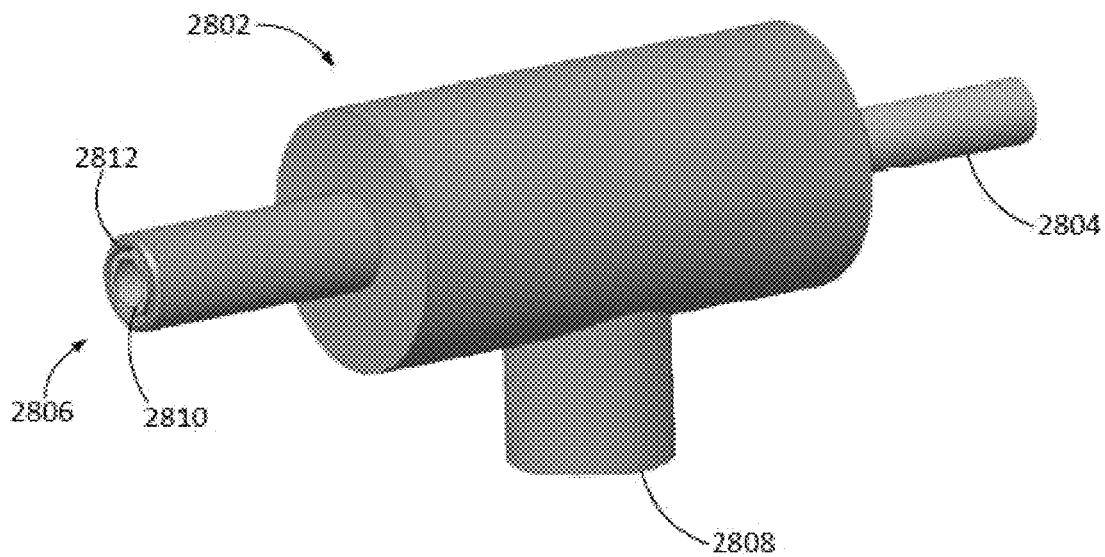
FIG. 42 is a schematic perspective view of a spray applicator according to an embodiment.
Figure 43:
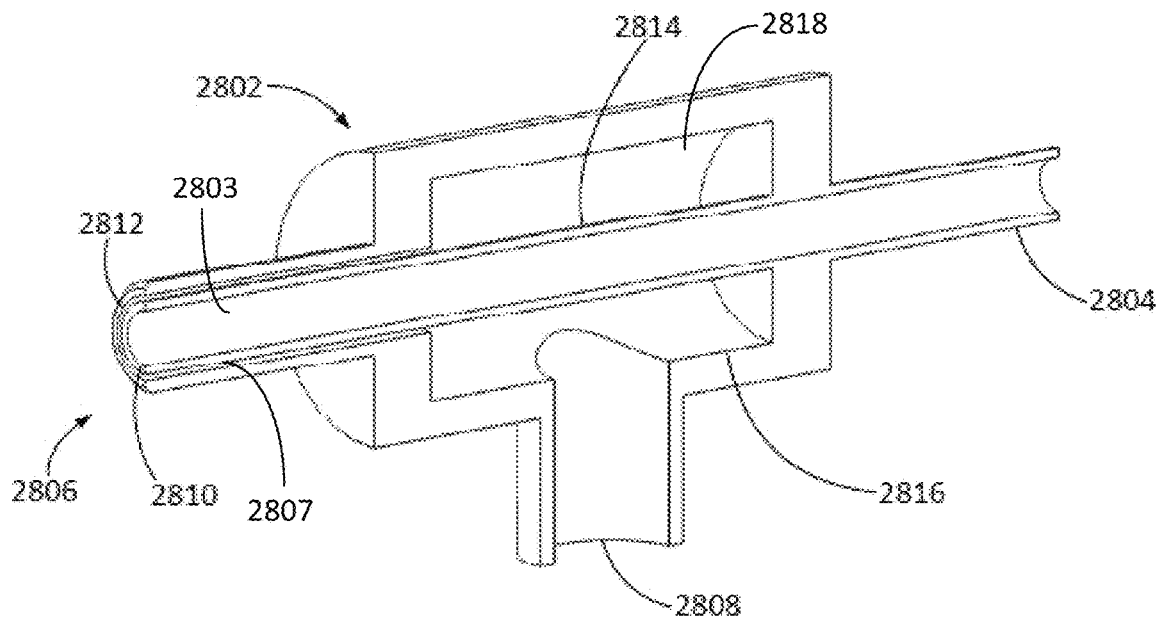
FIG. 43 is a schematic sectional view of the spray applicator of FIG. 42.
Figure 44:
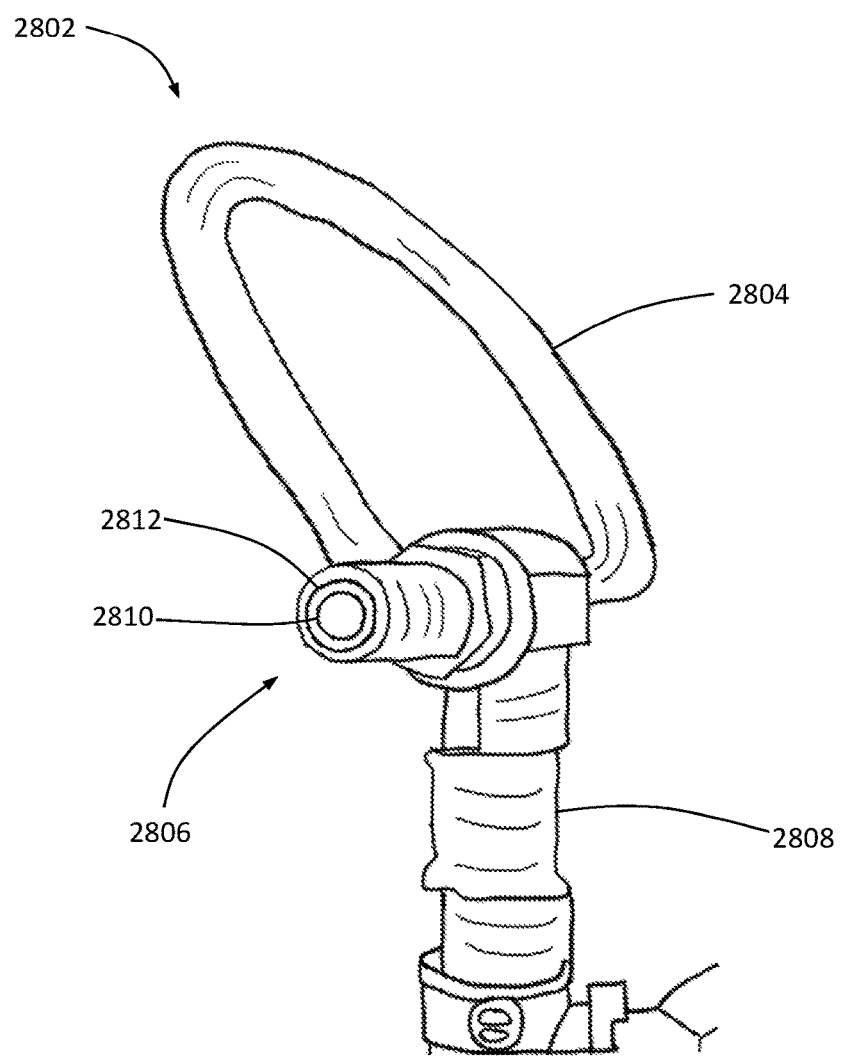
FIG. 44 is a perspective image of a spray applicator according to an embodiment.

FIGS. 42-44 depict a spray applicator 2802 configured for forming (e.g., depositing) a spray-on thermal insulator onto a surface by spraying a mixture of liquid and fibers onto the surface. In the embodiment illustrated, the spray applicator 2802 comprises a spray nozzle 2806 having concentric inner 2803 and outer 2807 flow paths. Preferably, the system is configured such that: i) the pump 2704 moves a fibrous coating mixture comprising liquid and fibers from the mixing vessel 2608, to the spray applicator 2802, through the inner flow path 2803, and out of the spray nozzle 2806, while simultaneously ii) a gas stream is flowed through the outer flow path 2807 and out of the spray nozzle.

By discharging from the nozzle 2806 a high velocity gas stream that surrounds a slurry flow stream, the slurry can be accelerated toward the desired surface due to interaction between the two flow streams (e.g., due to action of the high velocity outer gas stream on the inner slurry stream emanating from the nozzle). More will be said of this later.

Thus, the illustrated spray nozzle 2806 has two concentric discharge orifices, a slurry discharge orifice 2810, and a gas discharge orifice 2812. Preferably, the slurry orifice 2810 is the centermost one of the two concentric orifices. The illustrated gas orifice 2812 completely surrounds the slurry orifice 2810, although this is not strictly required. Typically, the slurry orifice 2810 will have a larger cross-sectional area than does the gas orifice 2812. In the non-limiting design illustrated, the gas discharge orifice 2812 has an annular cross-sectional shape, while the slurry discharge orifice 2810 has a circular cross-sectional shape. Here, the annular gas discharge orifice 2812 entirely surrounds the circular slurry discharge orifice 2810. While these details are currently preferred, they are not required in all embodiments.

A slurry intake (e.g., hose, pipe, tube, or other intake line) 2804 is connected to the spray applicator 2802 to supply a flow of slurry to the applicator. In the embodiment shown, the slurry intake 2804 is located at a rear end region of the spray applicator 2802, and the nozzle 2806 is at an opposite, front end region of the applicator. It is to be appreciated, however, that this is merely one possible applicator configuration.

The spray applicator 2802 of FIGS. 42 and 43 includes both a gas intake (e.g., a bore, pipe, tube, port, or other inlet) 2808 and a pressure reduction manifold chamber 2818. Air or another desired gas is delivered to the spray applicator 2802 through the gas intake 2808. As shown in FIG. 43, the gas intake 2808 opens into (and is in fluid communication with) the pressure reduction manifold chamber 2818. In the embodiment illustrated, the manifold chamber 2818 has a generally cylindrical configuration and the gas intake 2808 opens into a side of the cylindrically shaped chamber 2818. Preferably, the gas intake 2808 has smaller dimensions (a smaller cross-sectional area, a smaller volume, or both) than does the pressure reduction manifold chamber 2818. This can cause pressurized gas, flowing from the gas intake 2808 into the pressure reduction manifold chamber 2818, to experience a pressure drop upon entering the manifold chamber. This can advantageously provide the nozzle 2806 with a high velocity, low pressure gas discharge (e.g., a high velocity, low pressure airstream emanating from the outlet of the nozzle). In embodiments of this nature, the nozzle 2806 is particularly well suited for spray depositing a thermal insulator coating that has internal thermally insulative gas spaces, such as a fluffed gas-trapping coating.

In the illustrated spray applicator 2802, compressed gas is supplied to the gas intake 2808. Compressed air, for example, can be supplied at about 15-30 psi, and the volume of the supplied air can be metered. The compressed air enters the spray applicator 2802 via the gas intake 2808, flows through the manifold 2818, along the outer flow path 2807, and out the gas discharge orifice 2812. The supply of pressurized air can be flowed through the spray apparatus 2802 to its gas discharge orifice 2812, while simultaneously the pump 2704 is operated to supply a flow of slurry to the nozzle 2806. This can produce a high velocity, low pressure air flow, which is discharged from the gas orifice 2812, while a low volume, low pressure slurry flow is simultaneously discharged from the slurry orifice 2810. As the slurry exits the nozzle 2806 together with the surrounding gas stream, the slurry is accelerated somewhat by the gas stream. Moreover, the flows of gas and slurry may mix somewhat due to the geometry of the spray nozzle and the dynamics of the resulting air/slurry discharge.

As shown in FIG. 43, the manifold chamber 2818 opens to (and is in fluid communication with) the outer flow path 2807 of the nozzle 2806. The illustrated manifold chamber 2818 surrounds a length of (e.g., a portion of a pipe, hose, tube, or other line that defines) the nozzle's inner flow path 2803. While these details are advantageous, it is not necessary that all embodiments use an applicator of this particular design. For example, it may be acceptable or even desirable in some cases to eliminate the pressure reduction manifold chamber. Additionally or alternatively, it may be desirable to provide the inner and outer discharge orifices in different shapes, e.g., the inner discharge orifice may have a rectangular shape. Thus, the details of the preferred embodiments shown here are by no means required in all embodiments.

FIGS. 39 and 40 depict an exemplary mixing vessel 2608 in accordance with certain embodiments of the invention. The illustrated mixing vessel 2608 is generally cylindrical and has a cylinder axis. The mixing vessel 2608 includes a high-sheer mixer with a high sheer mixing head (e.g., blade) 2606. Preferably, the high-sheer mixer has a drive shaft 2607 that is offset laterally, angularly, or both from the cylinder axis. FIG. 40 is a sectional view of the mixing vessel 2608 and mixing head 2606 taken along a centerline of the mixing vessel. As can be seen, the drive shaft 2607 and the mixing head 2606 are offset laterally from the center of the vessel 2608. In addition, they preferably are offset angularly from the cylinder axis. In some cases, the angular offset from center is in the range of about 10-15%. It will typically be desirable to avoid aerating the slurry in the mixing vessel 2608. To this end, an offset location and/or an offset angle can reduce the extent to which air is drawn into the slurry. When provided, the offset location and/or offset angle can minimize cavitation resulting from the mixing action of the mixing head. In addition, the offset location and/or offset angle can provide more uniform mixture of fibers within the liquid, and can reduce the clumping of fibers by continuously breaking up the slurry.

FIGS. 39 and 40 show a motor 2604 configured to rotate the drive shaft 2607 of the mixer. The motor 2604 rotates the drive shaft 2607, which in turn rotates the mixing head 2606. The mixing head can optionally comprise a generally disc-shaped blade. The motor 2604 can advantageously be a variable high speed motor 2607, which can be controlled by an adjustable speed control.

In the embodiments of FIGS. 39 and 40, the mixing vessel 2608 has a cylindrical interior sidewall 2609 bounding (e.g., surrounding) an interior 2603 of the vessel. In the embodiment illustrated, the mixing vessel 2608 includes a pick-up port 2612 that projects inwardly of the vessel's interior sidewall 2609. In some cases, the intake end of the pick-up port 2612 is spaced inwardly from the vessel's interior sidewall 2609 by at least ½ inch, such as about 1 inch. The pick-up port 2612 is configured to receive (e.g., suck in) a fibrous coating mixture from the interior 2603 of the mixing vessel 2608. Preferably, the pick-up port 2612 is adjacent to the mixing head 2606, such that the pick-up port is positioned to receive (e.g., extract or "sample") the fibrous coating mixture from a high velocity region 2605 of the vessel's interior 2603. In some non-limiting embodiments, the pick-up port 2612 and the mixing head (e.g., rotatable blade) 2606 are separated by less than 2 inches, such as less than 1.75 inches, or less than about 1.5 inches. The high velocity region is an area within the mixing vessel 2608 where the slurry experiences a particularly high velocity, and/or is particularly well mixed, due to the mixing action of the mixing head 2606.

The pick-up port 2612 preferably has a smooth bore and an outlet end region 2610 spaced outwardly from the exterior of the mixing vessel 2608. This is perhaps best seen in FIG. 39. Outside of the mixing vessel 2608, a slurry hose (e.g., hose 2702 in FIG. 41) is connected to the outlet end region 2610, preferably such that the connection of the slurry hose to the outlet end region 2610 results in a smooth connection, which can help prevent ceramic fibers from becoming clogged in the connection fitting or interface.

The system includes a pump 2704 configured to move the fibrous coating mixture from the mixing vessel 2608 to the spray applicator 2802. Given the fibrous nature of the coating mixture, the pump 2704 preferably is a positive displacement pump, such as a peristaltic pump. One suitable peristaltic pump is the 913 series MityFlex® Variable Speed Peristaltic Pump, which can be purchased commercially from Anko Products of Bradenton, Fla., USA.

Figure 41:
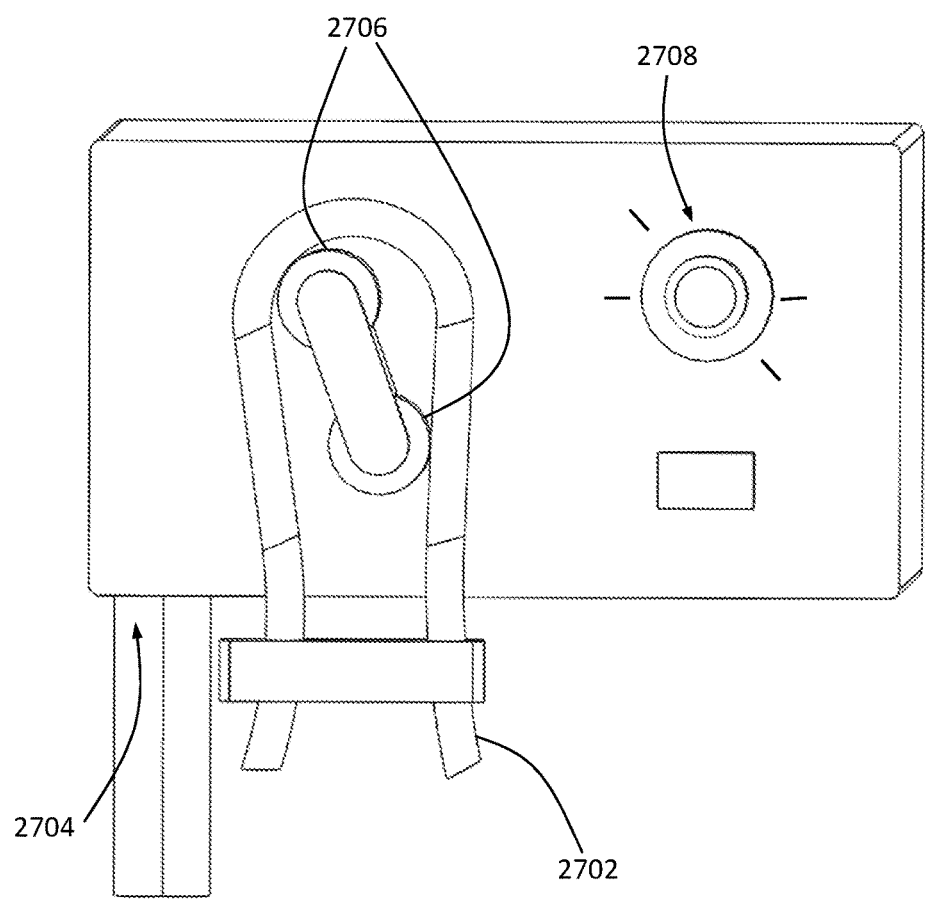
FIG. 41 is a front image of a pump according to an embodiment.

FIG. 41 depicts a suitable peristaltic metering pump. Here, the slurry hose 2702 is set within the pump 2704 so that the fiber/liquid slurry can be moved by the pump's positive displacement action. As the pump turns, the two wheels 2706 alternately compress and relax the segment of the slurry hose set within the pump. The alternating compression and relaxation of the pump on this hose segment positively forces the slurry through the hose. A downstream length of the slurry hose delivers the slurry to the spray applicator. Preferably, the pump 2704 has a pumping speed control 2708, which permits the operator to adjust the flow rate at which the slurry is moved to the spray applicator. In one non-limiting example, the slurry flow rate is characterized by a pump rate of about 10 to 200 gallons per day, such as about 30-40 gallons per day, when spraying. When using a slurry pump rate of about 30 gallons per day, and when using the particular system shown, a suitable non-limiting airflow rate from the spray nozzle may be about 5-10 cfm. In some cases, an approximate flow ratio suitable for use with the system shown may be approximately 5-10 cfm gas flow (e.g., air flow) to 75 ml/min slurry flow.

Thus, the system preferably includes a slurry line (e.g., tubing) configured to deliver the fibrous coating mixture from the mixing vessel 2608 to the pump 2704, and from the pump to the spray applicator 2702. The slurry line can take different forms, but preferably involves as few segments as possible, so as to minimize the number of interfaces/fittings where fibers in the slurry may get caught and build-up.

The invention also provides methods of applying a coating onto a desired surface. In some embodiments, the method involves applying a thermal insulator coating onto a desired surface of a mold or insert or preform. Preferably, the coating application is done by spraying a coating mixture onto the desired surface. The coating, for example, can advantageously be a thermal insulator coating. In some cases, the sprayed coating mixture is a fibrous coating mixture, and the resulting thermal insulator coating comprises fibers and has (e.g., bounds, contains, surrounds, or defines) internal thermally insulative gas spaces (e.g., "air gaps").

The spraying can advantageously be done using a spray applicator 2802 comprising a spray nozzle 2806 with concentric inner 2803 and outer 2807 flow paths. As noted above, the fibrous coating mixture preferably comprises liquid and fibers. The process may involve pumping the fibrous coating mixture through the inner flow path 2803 and out of the spray nozzle 2806, while simultaneously flowing a gas stream through the outer flow path 2807 and out of the spray nozzle. As discussed previously, this can result in a mix of slurry material and gas emanating from the spray nozzle 2806.

The spray applicator 2802 can advantageously include a gas intake 2808 and a pressure reduction manifold chamber 2818. In such cases, the gas intake 2808 preferably opens into the pressure reduction manifold chamber 2818. As shown in FIG. 43, the gas intake 2808 preferably has a smaller cross-sectional dimension than does the manifold chamber 2818 such that pressurized gas flowing from the gas intake into the manifold chamber experiences a pressure drop upon entering the pressure reduction manifold chamber. In the embodiment of FIG. 43, the manifold chamber 2818 opens to the outer flow path 2807 of the spray nozzle 2806. Thus, in the present methods, pressurized gas may flow sequentially from the gas intake 2808, through the pressure reduction manifold chamber 2818 (preferably undergoing a pressure reduction upon flowing into the manifold chamber), through the outer flow path 2807, and out of the spray nozzle 2806. In certain embodiments, the outer flow path 2807 has a cross-sectional area and/or volume that is smaller, preferably much smaller, than that of the manifold chamber 2818. For example, the ratio of the cross-sectional area of volume of the outer flow path divided by that of the manifold chamber can advantageously be less than ½, less than ⅓, or even less than ⅕.

With continued reference to FIG. 43, it can be seen that the manifold chamber 2818 surrounds a length of the nozzle's inner flow path 2803. Thus, the pressurized gas, when flowing through the manifold chamber 2818, moves around a pipe, tube, or other line that defines the noted length of the nozzle's inner flow path 2803. While this arrangement provides an effective pressure reduction mechanism, it is by no means strictly required.

In some of the present embodiments, the method comprises mixing liquid and fibers in a mixing vessel 2608 so as to create the fibrous coating mixture. The liquid can comprise water, optionally together with a conventional mold release agent, as is commercially available from numerous suppliers, including Chem-Trend LP., of Howell, Mich., U.S.A.

The mixing can advantageously be done using a high-sheer mixer comprising a high-sheer mixer head 2606, optionally comprising a generally disc-shaped high-sheer mixer blade. One suitable high-sheer mixer is the REL-MIXER product, which is commercially available from REL, Inc. of Calumet, Mich., USA. Preferably, the mixing vessel 2806 has a cylindrical interior sidewall 2609 bounding an interior 2603 of the vessel, as exemplified in FIG. 40. Here, the mixing vessel 2806 includes a pick-up port 2612 that projects inwardly of the vessel's interior sidewall 2609. The method involves rotating the mixer head 2606 so as to conduct the mixing. This preferably creates within the mixing vessel 2608 a high velocity region 2605 adjacent to the pick-up port 2612. Thus, the method can advantageously involve using the pick-up port 2612 to extract fibrous coating mixture from the high velocity region 2605.

As noted above, the method involves mixing liquid and fibers together in a mixing vessel 2608 so as to create the fibrous coating mixture, followed by pumping the fibrous coating mixture to a spray nozzle 2806. Given the fibrous nature of the coating mixture, the pumping preferably is done using a positive displacement pump, such as a peristaltic pump.

In some cases, the initial mixture includes a liquids-to-solids weight ratio of about 5% to 10% (i.e., a liquids-to-solids ratio from about 5:100 to about 10:100). Once the effluent is driven off, the solids-to-liquids ratio would be 100% to 0%.

The thickness of the coating deposited can be varied to accommodate the requirements of different applications. In some cases, the fibrous coating mixture is sprayed onto the desired surface so as to deposit the thermal insulator coating at a thickness of between 0.01 inch and 0.2 inch, such as between about 0.012 inch and about 0.18 inch. In some embodiments, the thickness of the coating is between about 0.015 inch and about 0.030 inch. It is to be appreciated, however, that lesser or greater thicknesses may be preferred.

In some embodiments, a target density for the spray-on thermal insulator can be between about 7% to about 20% of volume. That is, when the coating has been allowed to dry, the ceramic fibers occupy between about 7% and about 20% of volume of the coating. In some cases, a target density of about 15% is desirable. In other cases, a target density of between about 5% and about 10% is desirable, e.g., when using ceramics fibers with a relatively long fiber length. In still other cases, a target density of between about 15% and about 25% is desirable, e.g., when using ceramics fibers with a relatively short fiber length. The density of the spray-on thermal insulator can be impacted by the composition of the slurry (including the ratio of liquid to ceramic fibers) and the relative flow rates of the air to the slurry through the nozzle.

Ceramic fibers of relatively long length tend to create more undulation for the resulting coating. By contrast, ceramic fibers of relatively short length tend create a smoother surface for the coating.

The optimum balance of air flow rate and slurry flow rate can depend upon a number of variables, including the following: (i) the particular fibers that are used in the slurry; (ii) the ratio of liquid to fibers used in mixing the slurry; (iii) the air pressure of the compressed air introduced into the nozzle inlet 2808; and (iv) the target density for the resulting coating. In one non-limiting example, a slurry flow rate of between about 2.5 fluid ounces (about 75 cubic centimeters) per minute and about 3.5 fluid ounces (about 105 cc) per minute is used.

It is contemplated that a number of different types of fibers can be used. In some embodiments, the fibers comprise ceramic, e.g., oxide fibers. If desired, the fibers can comprise silica fibers, alumina fibers, or both. As just one example, ceramic fibers can be obtained from a polycrystalline fiber blanket, such as the Thermal Ceramics Saffil LD Mat. If desired, the ceramic fibers can be from a refractory ceramic fiber blanket, such as the Thermal Ceramics Kaowool mat. Other commercial sources for ceramic fibers include Carbon Fiber, Nextel Fiber and 3M Fibers. In some embodiments, the ceramic fiber mat can be chopped prior to combining with the liquid.

When spraying onto intricate details of a mold cavity, it may be desirable to use conventional computer-aided robotics. Further, it is advantageous to employ rapid repeatable robotic application without human intervention.

The thermal insulator coating can be used in various casting methods and systems as will be further described herein. In each of these systems and methods, the thermal insulator coating can be a thermal insulator coating or a spray-on thermal insulator having a composition as already described above. Also, any steps of depositing a thermal insulator coating can be a step of spraying or spray-depositing the thermal insulator coating using equipment as already described above.

In other embodiments further described below, the thermal insulator is not a coating but can be a thermal blanket as described in U.S. provisional patent application No. 61/623,532 filed Apr. 12, 2012, entitled Thermal Isolation for Casting Articles or in U.S. patent application Ser. No. 13/840,423 filed concurrently herewith, entitled Thermal Isolation for Casting Articles, the entire contents of each of which are incorporated herein by reference. Some or all of the embodiments applicable to thermal blankets in these related application may also be applicable to the spray-on thermal insulator coatings described herein.

Further, some Figures show all surfaces of an article (mold cavity, preform, insert, etc.) bearing a thermal insulator coating and other Figures show only a single surface or only some surfaces bearing a thermal insulator coating. However, skilled artisans will understand that in each of these Figures, the thermal insulator coating can be provided on a single surface, on some surfaces or on all surfaces of an article. Also, some Figures show a single layer of thermal insulator coating on a surface. However, skilled artisans will understand that this single layer can instead be a plurality of layers that make up the coating. Likewise, the single layer or plurality of layers can each have any desired thickness.

FIG. 2 illustrates a general casting system 10 according to an embodiment. The casting system 10 can include a mold 12 having a mold cavity 14, a preform or insert 16 a source of molten material 18 and a thermal insulator coating source 20. In some cases, the thermal insulator coating source 20 includes the equipment described in FIGS. 39-44 above.

As used herein, the term "preform" or "casting preform" is used to reference a material that can be infiltrated with a molten material. Also, the term "insert" or "casting insert" is used herein to indicate a piece of material that would not be infiltrated. For example, an insert might be solid material like a piece of steel. In some cases, the preform is a porous preform, a variable density preform or a porous variable density preform wherein the preforms are suitable for infiltration casting. The preform can include for example, ceramic particles, continuous or discontinuous ceramic fibers or a combination thereof.

The source of molten material 18 can include any desired molten material known in the art usable in methods for casting articles. In some cases, the molten material can include at least one metal (e.g., in elemental, compound, or alloy forms). In certain cases, one or more metals including aluminum, magnesium, and/or steel can be used. Further, in some cases, the molten material can include a particulate material. One example of such a material is Duralcan, which includes SiC particles suspended in aluminum.

The mold 12 can include any desired mold known in the art and the mold cavity 14 can include any desired shape. In some cases, the mold is a gravity casting mold. In other cases, the mold is a squeeze casting mold. In a squeeze casting mold, a first portion presses against a second portion to apply pressure to materials inside the mold cavity. In other cases, the mold includes a shoot sleeve and plunger that can be actuated to inject molten material into the mold cavity. In some cases, the mold 12 includes contours in the mold cavity surface. Such contours can include voids, crevices, depressions, recesses, runs that form surface features in a cast article.

Figure 3:
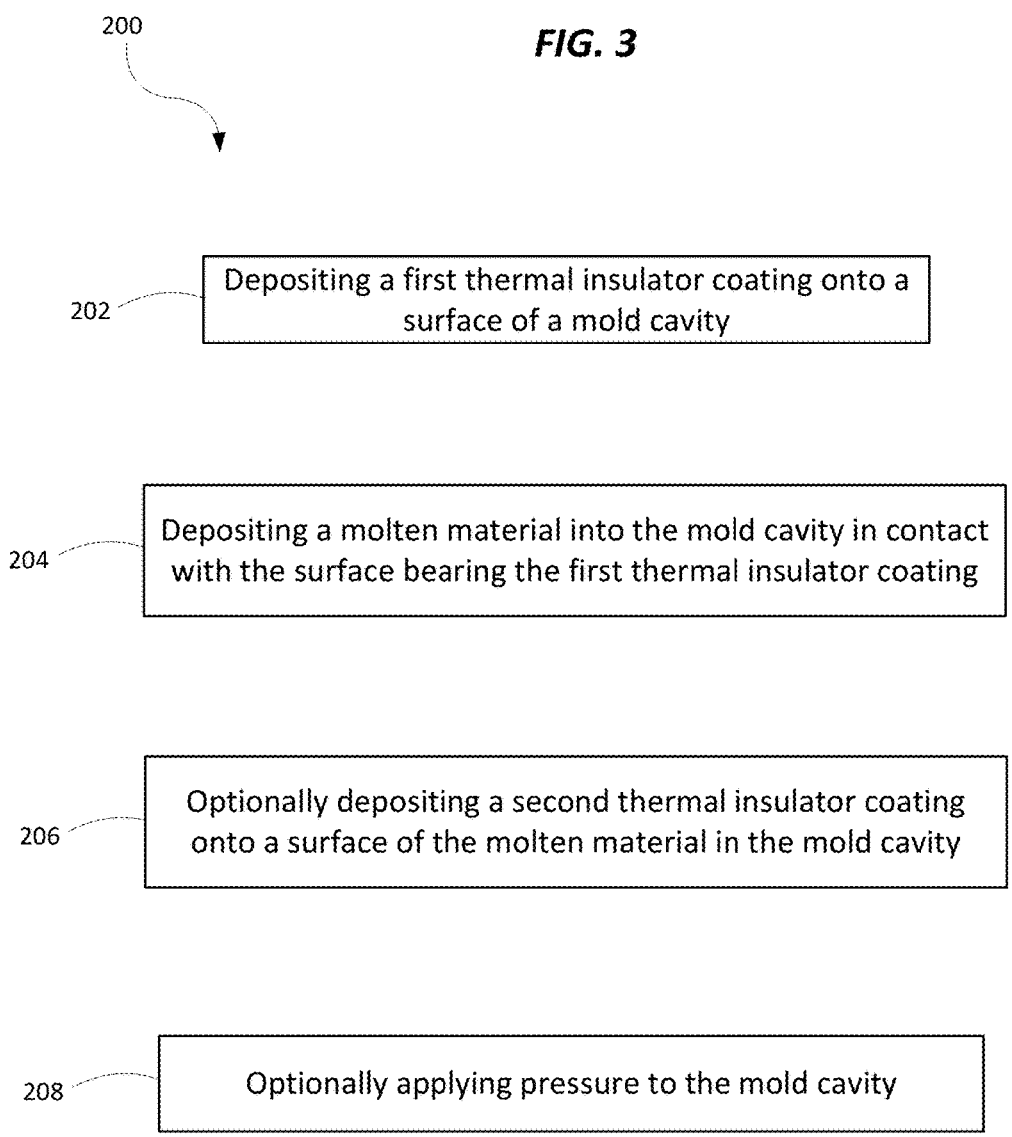
FIG. 3 is a flow diagram illustrating a method for casting an article using a thermal insulator according to an embodiment.

FIG. 3 illustrates a method 200 for casting an article using a thermal insulator coating according to one embodiment. The method 200 generally includes a step 202 of depositing the thermal insulator coating onto a surface of the mold cavity, a step 204 of depositing a molten material into the mold cavity in contact with the surface bearing the thermal insulator coating, an optional step 206 of depositing a second thermal insulator coating onto a surface of the molten material in the mold cavity and an optional step 208 applying pressure to the mold cavity. In the optional step 206, the second thermal insulator coating can include the same thermal insulator coating material as the first thermal insulator coating used in step 202 or a different thermal insulator coating material. In the optional step 208, the pressure causes the molten material to solidify the molten material and to infiltrate the thermal insulator coating.

Figure 4:
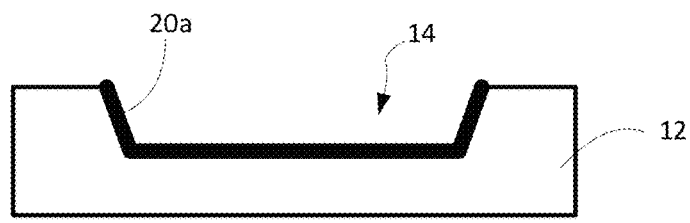
FIG. 4 is a side cross-sectional view of a mold cavity having a surface bearing a first thermal insulator coating.
Figure 5:
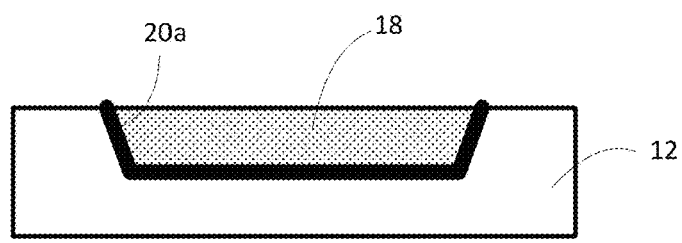
FIG. 5 is a side cross-sectional view of the mold cavity of FIG. 4, the mold cavity including molten material deposited therein.
Figure 6:
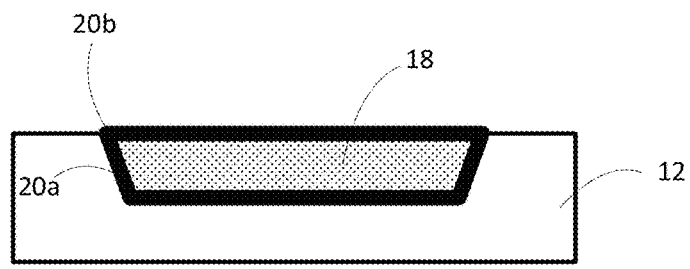
FIG. 6 is a side cross-sectional view of the mold cavity of FIG. 5, the molten material having a top surface bearing a second thermal insulator coating.

FIGS. 4-6 illustrate a cross-sectional view of a mold cavity during different stages in the method 200. FIG. 4 shows the mold cavity 14 having a surface bearing a first thermal insulator coating 20a. FIG. 5 shows the mold cavity 14 after a molten material 18 is deposited therein. As shown, the thermal insulator coating 20a isolates the molten material 18 from the mold 12. FIG. 6 shows the mold cavity after a second thermal insulator coating 20b is deposited on a top surface of the molten material 18. In FIGS. 4-6, the mold 12 can also include a top (not shown) that can close or secure the mold cavity 14 during solidification and/or pressurization.

Figure 7:
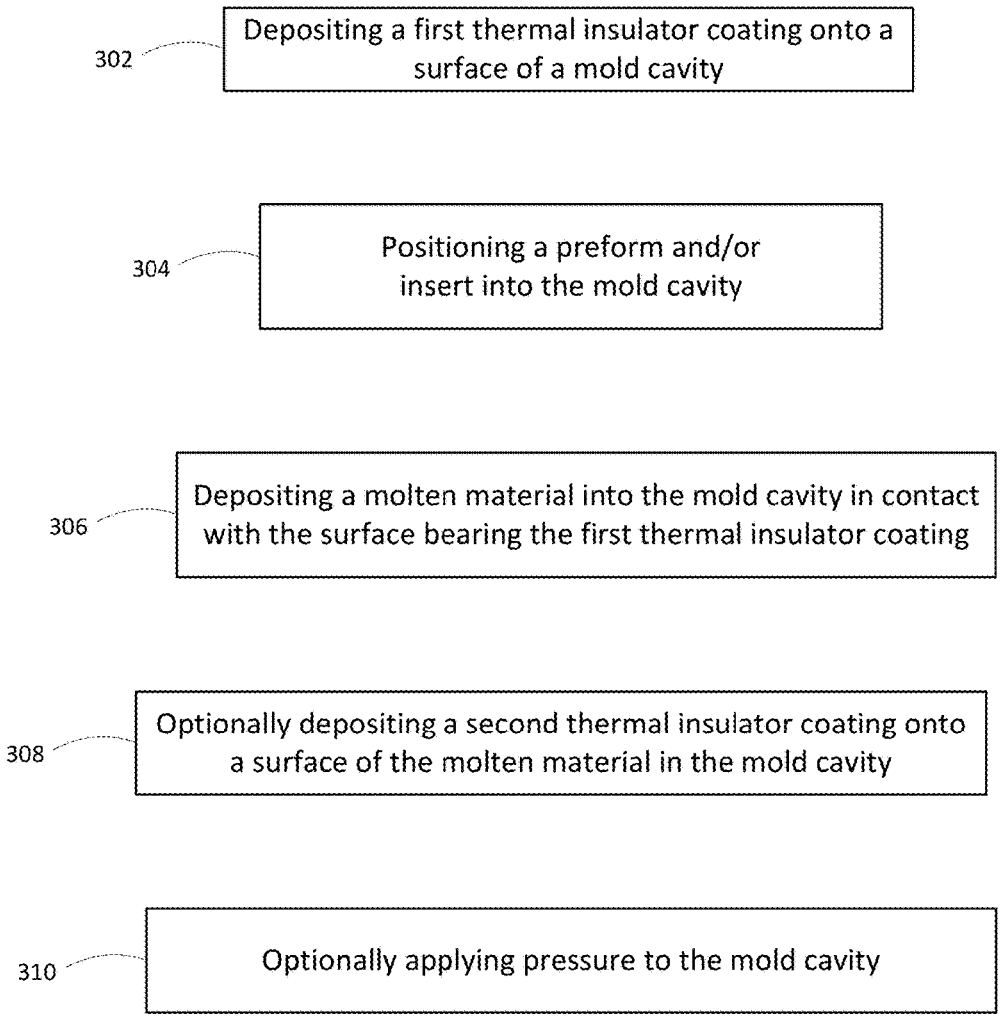
FIG. 7 is a flow diagram illustrating a method for casting an article using a thermal insulator according to another embodiment.

FIG. 7 illustrates a method 300 for casting an article using a thermal insulator coating according to another embodiment. The method 300 generally includes a step 302 of depositing a first thermal insulator coating onto a surface of the mold cavity, a step 304 of positioning a preform and/or an insert into the mold cavity, a step 306 of depositing a molten material into the mold cavity in contact with the surface bearing the first thermal insulator coating, an optional step 308 of depositing a second thermal insulator coating onto a surface of the molten material in the mold cavity and an optional step 310 of applying pressure to the mold cavity. In the optional step 308, the second thermal insulator coating can include the same thermal insulator coating material as the first thermal insulator coating used in step 302 or a different thermal insulator coating material. In the optional step 310, the pressure causes the molten material to solidify and also causes the molten material to infiltrate both the preform and the thermal insulator coating.

Figure 8:
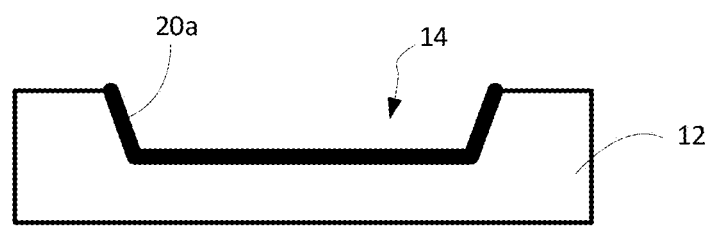
FIG. 8 is a side cross-sectional view of a mold cavity having a surface bearing a first thermal insulator coating.
Figure 9:
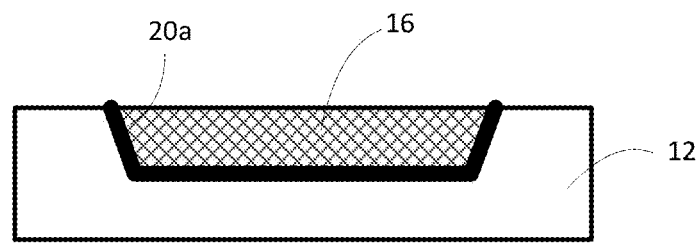
FIG. 9 is a side cross-sectional view of the mold cavity of FIG. 8, the mold cavity including preform deposited therein.
Figure 10:
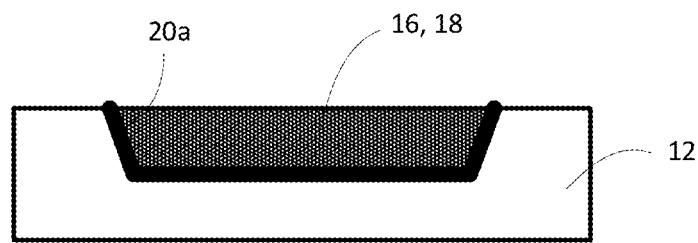
FIG. 10 is a side cross-sectional view of the mold cavity of FIG. 9, the mold cavity including molten material deposited therein.
Figure 11:
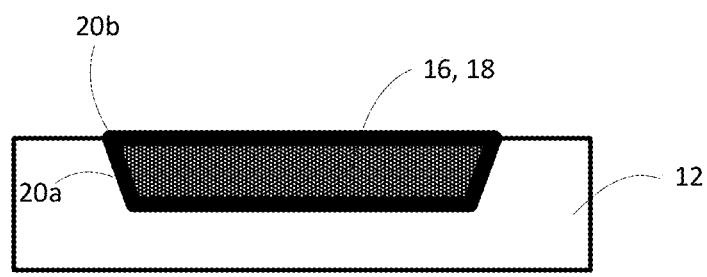
FIG. 11 is a side cross-sectional view of the mold cavity of FIG. 10, the molten material having a top surface bearing a second thermal insulator coating.

FIGS. 8-11 illustrate a cross-sectional view of a mold cavity during different stages in a method 300. FIG. 8 shows the mold cavity 14 having a surface bearing a first thermal insulator coating 20a. FIG. 9 shows the mold cavity 14 after a preform or insert 16 is positioned therein. FIG. 10 shows the mold cavity 14 after a molten material 18 is deposited therein. As shown, the first thermal insulator coating 20a isolates both the preform or insert 16 and the molten material 18 from the mold 12. FIG. 11 shows the mold cavity after a second thermal insulator coating 20b is deposited on a top surface of the molten material 18. In FIGS. 8-11, the mold 12 can also include a top (not shown) that can close or secure the mold cavity 14 during solidification and/or pressurization.

FIG. 12 illustrates a method 400 for casting an article using a thermal insulator coating according to another embodiment. The method 400 generally includes a step 402 of depositing a first thermal insulator coating onto a surface of the mold cavity, a step 404 of depositing a first molten material into the mold cavity in contact with the surface bearing the first thermal insulator coating, a step 406 of depositing a second thermal insulator coating onto a surface of the first molten material, a step 408 of depositing a second molten material into the mold cavity in contact with the first molten material surface bearing the second thermal insulator coating, an optional step 410 of depositing a third thermal insulator coating onto a surface of the second molten material and an optional step 412 of applying pressure to the mold cavity. In steps 402, 406 and 410, the first thermal insulator coating material, the second thermal insulator coating material and the third thermal insulator coating material can each include the same thermal insulator coating material, a different thermal insulator coating material or a combination thereof. In the optional step 310, the pressure causes the molten material to solidify and also causes the molten material to infiltrate the thermal insulator coating.

Figure 13:
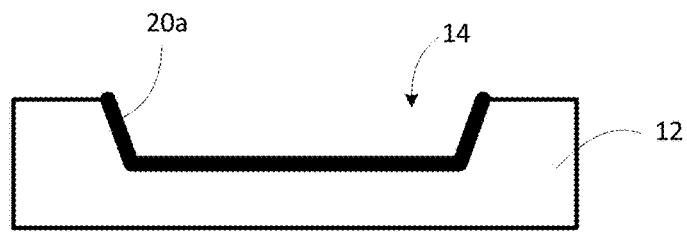
FIG. 13 is a side cross-sectional view of a mold cavity having a surface bearing a first thermal insulator coating according to an embodiment.
Figure 14:
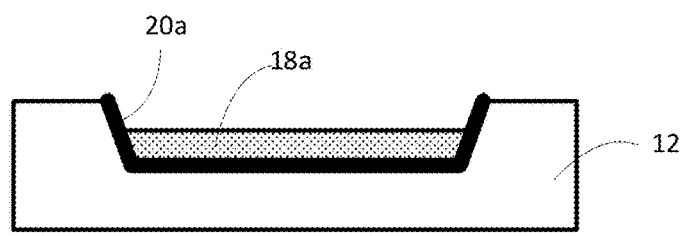
FIG. 14 is a side cross-sectional view of the mold cavity of FIG. 13, the mold cavity including a first molten material deposited therein.
Figure 15:
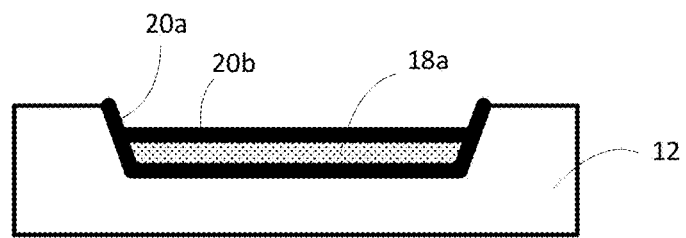
FIG. 15 is a side cross-sectional view of the mold cavity of FIG. 14, the first molten material having a top surface bearing a second thermal insulator coating.
Figure 16:
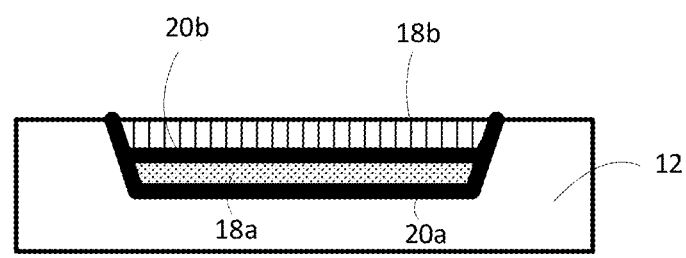
FIG. 16 is a side cross-sectional view of the mold cavity of FIG. 15, the mold cavity including a second molten material deposited therein.
Figure 17:
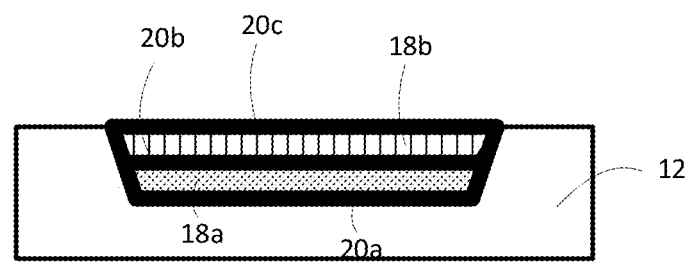
FIG. 17 is a side cross-sectional view of the mold cavity of FIG. 16, the second molten material having a top surface bearing a third thermal insulator coating.

FIGS. 13-17 illustrate a cross-sectional view of a mold cavity during different stages in the method 400. FIG. 13 shows the mold cavity 14 having a surface bearing a first thermal insulator coating 20a. FIG. 14 shows the mold cavity 14 after a first molten material 18a is deposited therein. As shown, the first thermal insulator coating 20a isolates the first molten material 18a from the mold 12. FIG. 15 shows the mold cavity after a second thermal insulator coating 20b is deposited on a top surface of the first molten material 18b. FIG. 16 shows the mold cavity 14 after a second molten material 18b is deposited therein. As shown, the second thermal insulator coating 20b isolates the first molten material 18a from the second molten material 18b. FIG. 17 shows the mold cavity after a third thermal insulator coating 20c is deposited on a top surface of the second molten material 18b. In FIGS. 13-17, the mold 12 can also include a top (not shown) that can close or secure the mold cavity 14 during solidification and/or pressurization.

Figure 18:
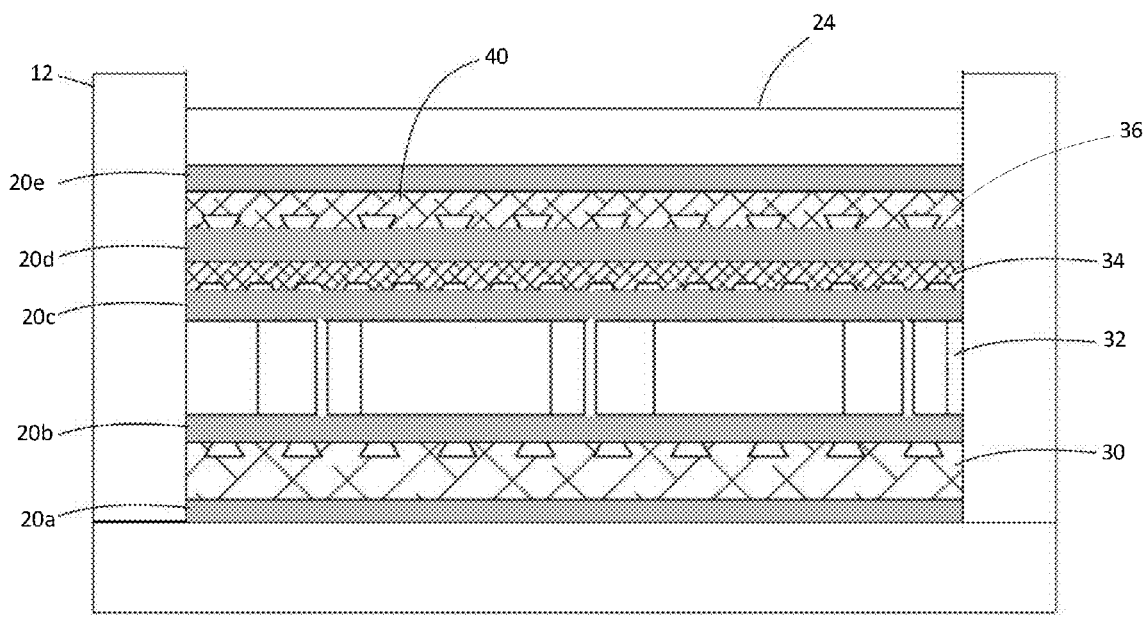
FIG. 18 is a schematic side cross-sectional view of a casting prior to applying pressure to a mold cavity according to an embodiment.

FIG. 18 illustrates an example of a multi-coating high performance composite casting 40 prior to applying pressure to a mold cavity according to an embodiment. As illustrated, the casting 40 includes several thermal insulating coatings 20a, 20b, 20c, 20d, 20e. Again, any desired number of thermal insulating coatings can be used in casting methods of the invention. In some cases, a thermal insulating coating can be positioned between each different casting coating and in other cases, a thermal insulating coating can be positioned between only some castings coatings. The casting 40 can include a variety of inserts, preforms and other materials to enhance the composite performance. In the particular casting 40 shown, the casting 40 includes, moving from the bottom to the top, a first thermal insulator coating 20a, an insert 30, a second thermal insulator coating 20b, another insert 32, a third thermal insulator coating 20c, a plurality of inserts (e.g, tiles), a fourth thermal insulator coating 20d, a preform 36 and a fifth thermal insulator coating 20e.

Figure 19:
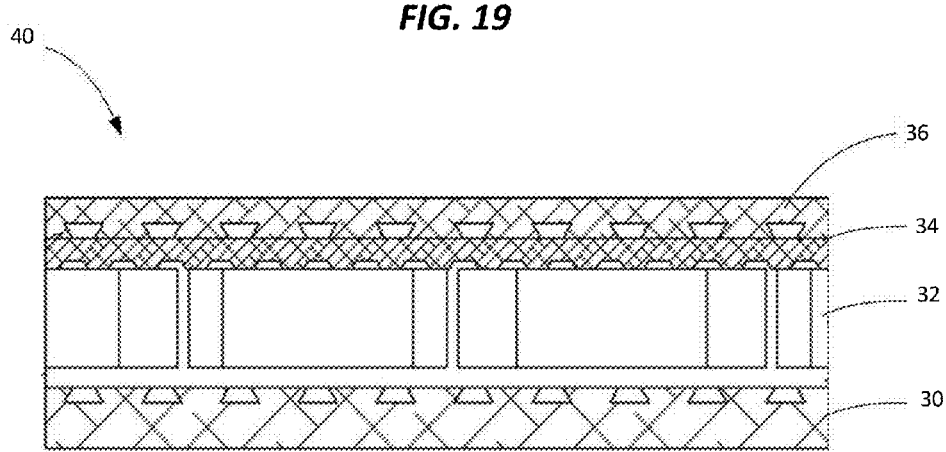
FIG. 19 is a schematic side cross-sectional view of the casting in FIG. 18 after applying pressure to the mold cavity and after solidification according to an embodiment.

The mold includes a moving top wall or plunger 24 that moves downward to apply pressure to the molten materials within the cavity. Upon applying pressure, the molten material infiltrates and substantially disintegrates the thermal insulating coatings 20a, 20b, 20c, 20d, 20e. FIG. 19 is a schematic side cross-sectional view of the casting 40 in FIG. 18 after applying pressure to the mold and solidification according to an embodiment. As can be seen, the thermal insulating coatings 20a, 20b, 20c, 20d, 20e have virtually disappeared.

FIG. 12 illustrates a method 400 for casting an article using a thermal insulator coating according to another embodiment. The method 400 generally includes a step 402 of depositing a first thermal insulator coating onto a surface of the mold cavity, a step 404 of depositing a first molten material into the mold cavity in contact with the surface bearing the first thermal insulator coating, a step 406 of depositing a second thermal insulator coating onto a surface of the first molten material, a step 408 of depositing a second molten material into the mold cavity in contact with the first molten material surface bearing the second thermal insulator coating, an optional step 410 of depositing a third thermal insulator coating onto a surface of the second molten material and an optional step 412 of applying pressure to the mold cavity. In steps 402, 406 and 410, the first thermal insulator coating material, the second thermal insulator coating material and the third thermal insulator coating material can each include the same thermal insulator coating material, a different thermal insulator coating material or a combination thereof. In the optional step 310, the pressure causes the molten material to solidify and also causes the molten material to infiltrate the thermal insulator coating.

Figure 20:
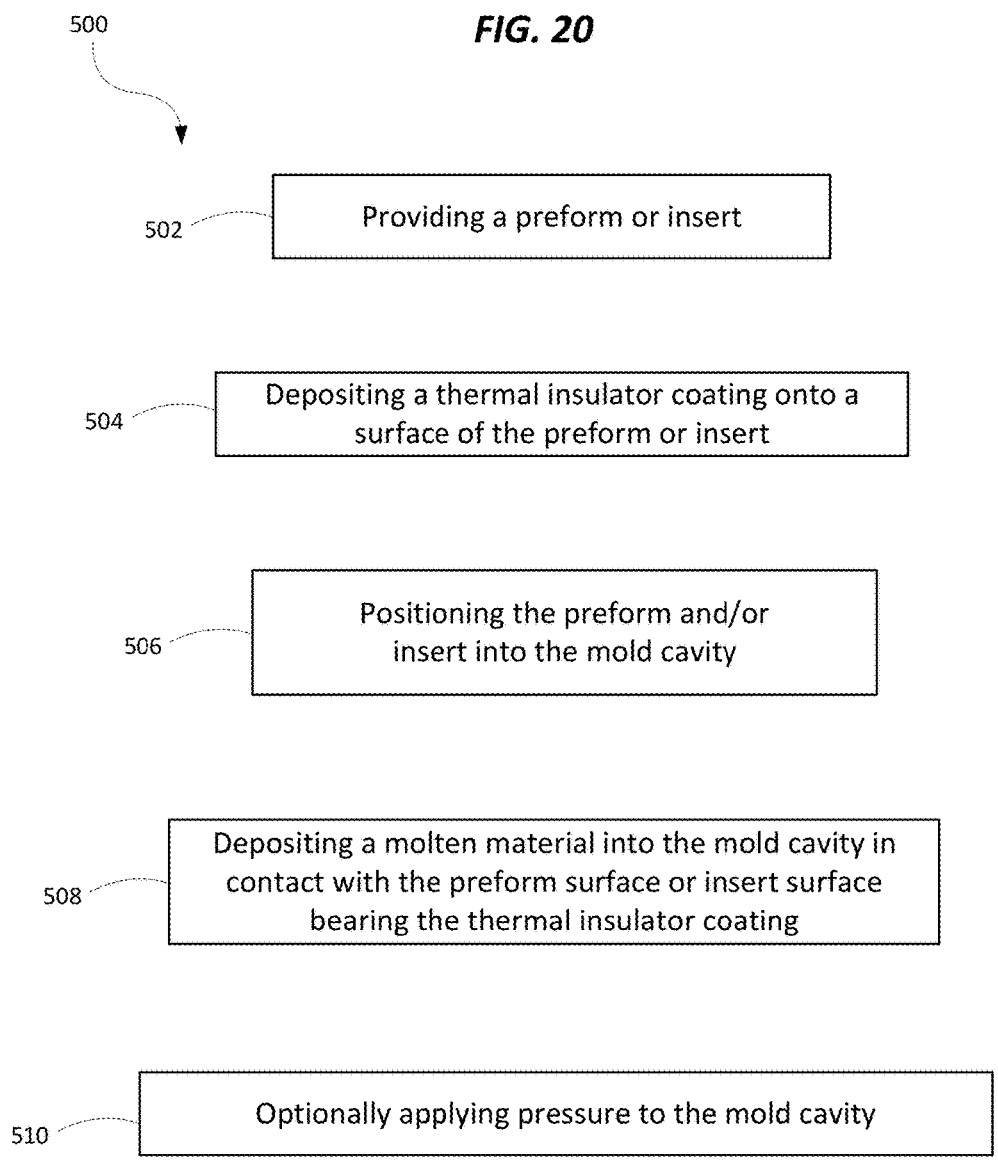
FIG. 20 is a flow diagram illustrating a method for casting an article using a thermal insulator coating according to another embodiment.

FIG. 20 illustrates a method 500 for casting an article using a thermal insulator coating according to another embodiment. The method 500 generally includes a step 502 of providing a preform or insert, a step 504 of depositing a thermal insulator coating onto a surface of the preform or insert, a step 506 of positioning the preform or insert into the mold cavity, a step 508 of depositing a molten material into the mold cavity in contact with the preform surface or insert surface bearing the thermal insulator coating and an optional step 510 of applying pressure to the mold cavity. In the optional step 510, the pressure causes the molten material to solidify and also causes the molten material to infiltrate both the preform and the thermal insulator coating.

Figure 21:
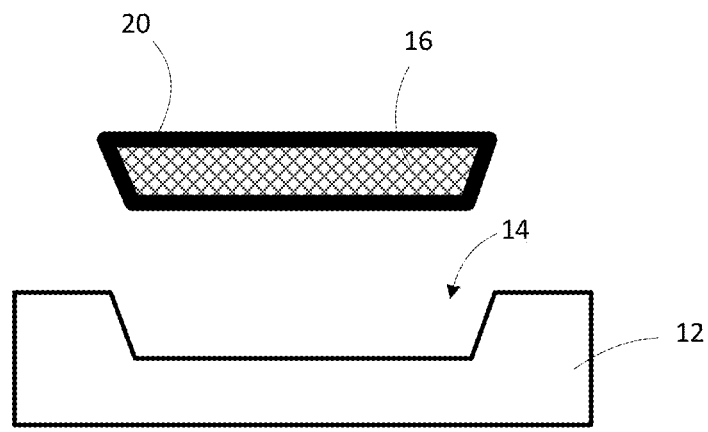
FIG. 21 is a side cross-sectional view of a preform coated with a thermal insulator coating and of a mold cavity.
Figure 22:
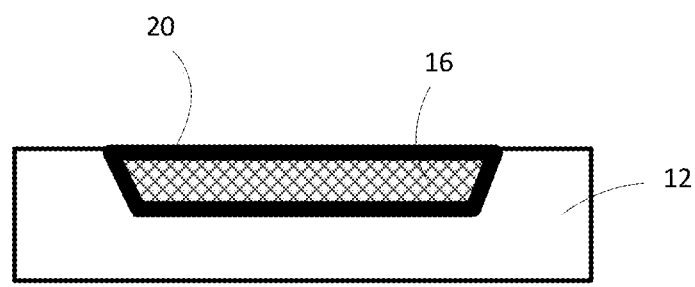
FIG. 22 is a side cross-sectional view of the preform and mold cavity of FIG. 21, the preform being positioned inside of the mold cavity.

FIGS. 21-22 illustrate a cross-sectional view of a mold cavity during different stages in the method 500. FIG. 21 shows a preform or insert 16, wherein a thermal insulator coating 20 covers the preform or insert 16. While FIG. 21 shows the thermal insulator coating 20 covering the entire preform or insert 16, skilled artisans will understand that the thermal insulator coating 20 need only cover a portion of the preform or insert 16. FIG. 22 shows the mold cavity 14 after the covered preform or insert 16 is deposited therein. In FIGS. 21-22, the mold 12 can also include a top (not shown) that can close or secure the mold cavity 14 during solidification and/or pressurization.

Figure 23:
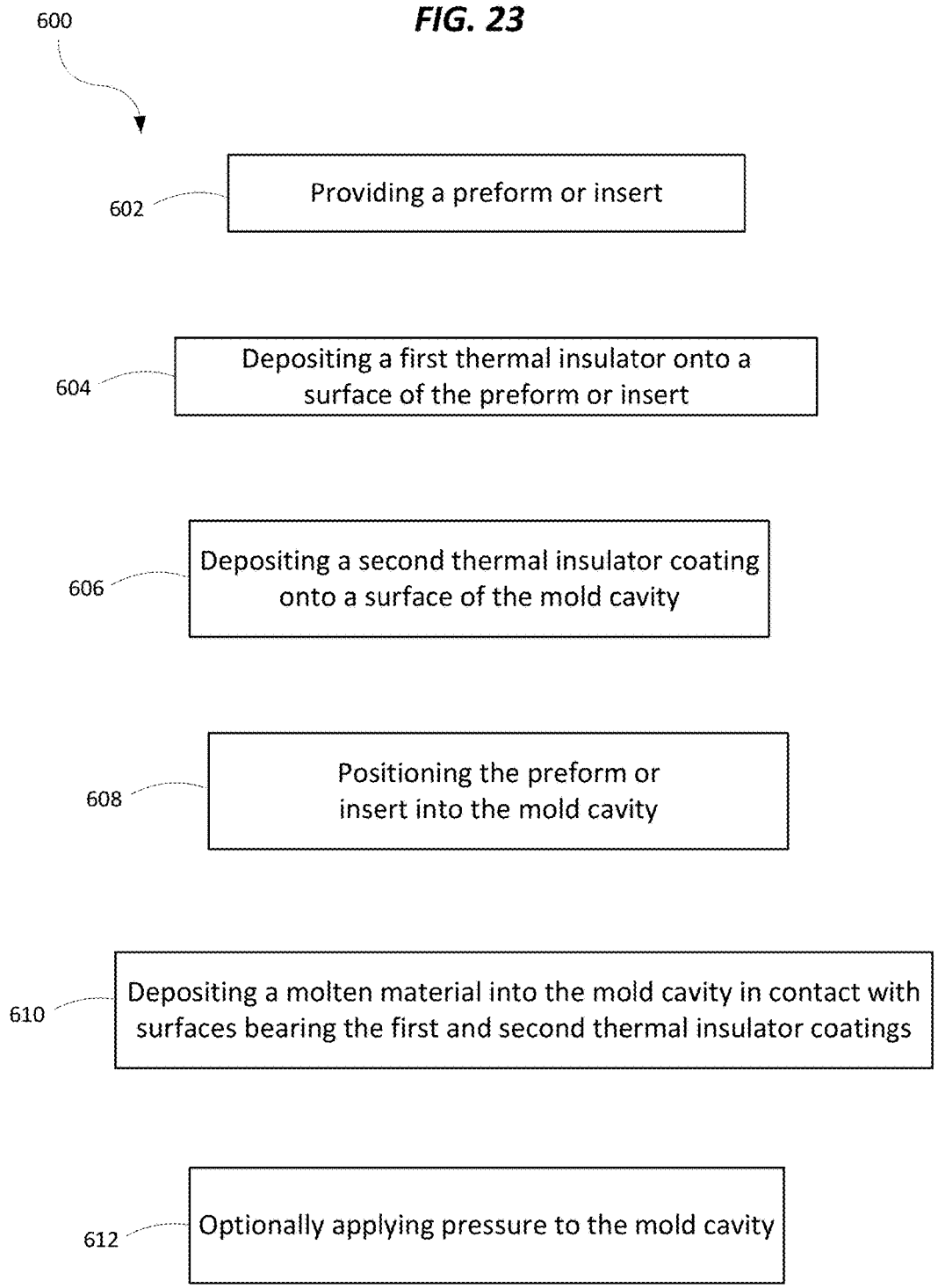
FIG. 23 is a flow diagram illustrating a method for casting an article using a thermal insulator coating according to another embodiment.

FIG. 23 illustrates a method 600 for casting an article using a thermal insulator coating according to another embodiment. The method 600 generally includes a step 602 of providing a preform or insert, a step 604 of depositing a first thermal insulator coating onto a surface of the preform or insert, a step 606 of depositing a second thermal insulator coating onto a surface of the mold cavity, a step 608 of positioning the preform or insert into the mold cavity, a step 610 of depositing a molten material into the mold cavity in contact with surfaces bearing the first thermal insulator coating and second thermal insulator coating and an optional step 612 of applying pressure to the mold cavity. In the optional step 612, the pressure causes the molten material to solidify and also causes the molten material to infiltrate both the preform and the thermal insulator coating.

Figure 24:
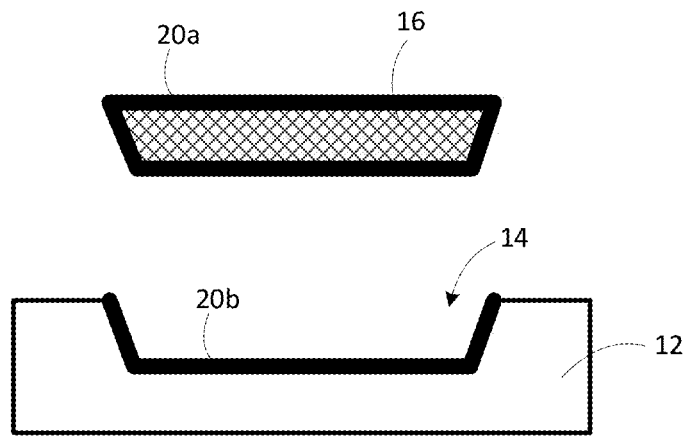
FIG. 24 is a side cross-sectional view of a preform coated with a first thermal insulator coating and of a mold cavity having a surface bearing a second thermal insulator coating according to an embodiment.
Figure 25:
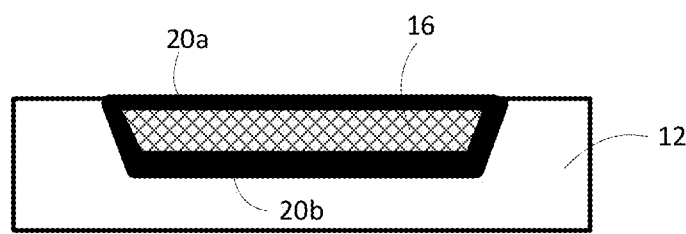
FIG. 25 is a side cross-sectional view of the coated preform and mold cavity of FIG. 24, the preform being positioned inside of the mold cavity.

FIGS. 24-25 illustrate a cross-sectional view of a mold cavity during different stages in the method 600. FIG. 24 shows a preform or insert 16, wherein a first thermal insulator coating 20a covers the preform 16 and a second thermal insulator coating 20b covers a surface of the mold cavity 14. While FIG. 24 shows the thermal insulator coating 20a covering the entire preform or insert 16, skilled artisans will understand that the thermal insulator coating 20a need only cover a portion of or a single surface of the preform or insert 16. Likewise, while FIG. 24 shows the second thermal insulator coating 20b covering all surfaces of the mold cavity 14, skilled artisans will understand that the thermal insulator coating 20a need only cover a portion of or a single surface of the mold cavity 14. FIG. 25 shows the mold cavity 14 after the covered preform or insert 16 is deposited therein. In FIGS. 24-25, the mold 12 can also include a top (not shown) that can close or secure the mold cavity 14 during solidification and/or pressurization.

Figure 26:
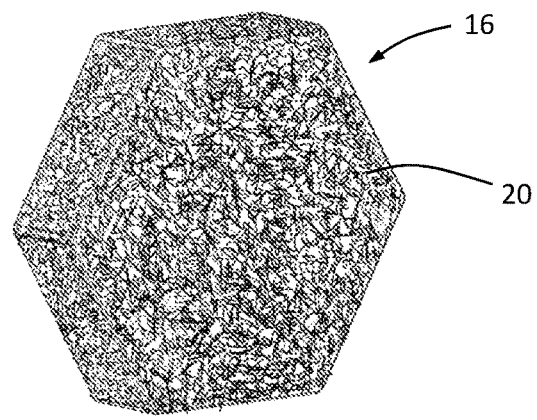
FIG. 26 is perspective view of a preform coated with a thermal insulator coating according to an embodiment.
Figure 27:
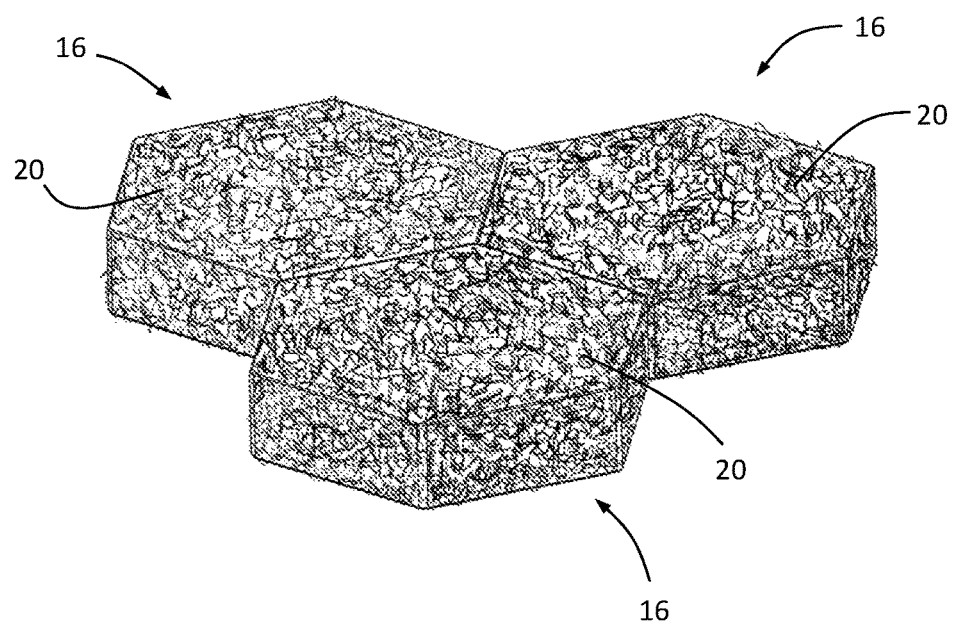
FIG. 27 is a perspective view of a plurality of preforms each coated with a thermal insulator coating according to an embodiment.

FIG. 26 shows a coated preform 16 and FIG. 27 shows three coated preforms or inserts 16 arranged together in an arrangement. As shown, the coated preforms or inserts 16 have been coated with a thermal insulator coating. In some embodiments, the thermal insulator coating is present on the preform as a coating having a thickness. The fibrous coating mixture can be sprayed onto the desired surface so as to deposit the thermal insulator coating at a thickness of between 0.01 inch and 0.2 inch, such as between about 0.012 inch and about 0.18 inch. In some embodiments, the thickness of the coating is between about 0.015 inch and about 0.030 inch. It is to be appreciated, however, that lesser or greater thicknesses may be preferred.

Figure 28:
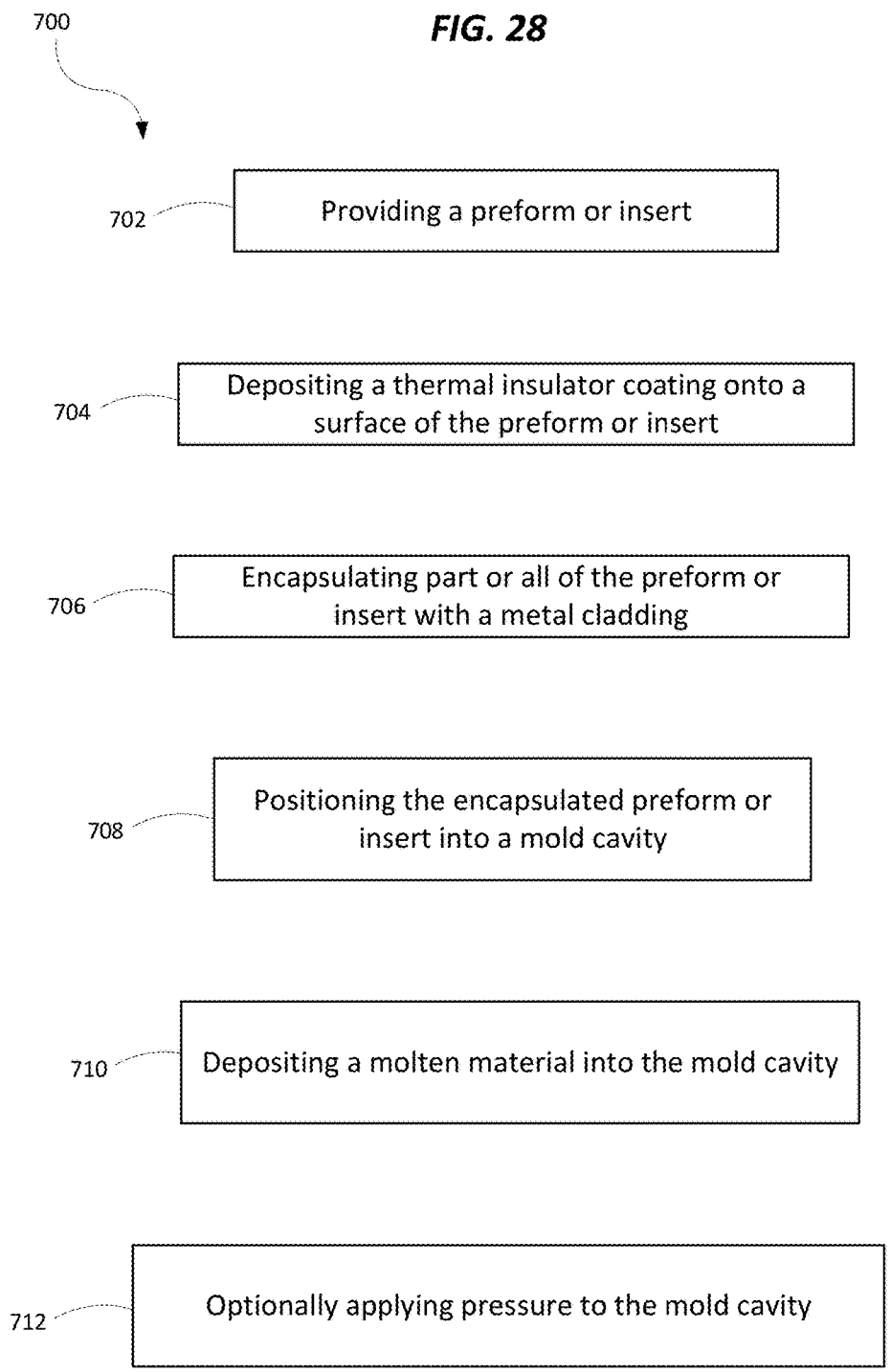
FIG. 28 is a flow diagram illustrating a method for casting an article according to another embodiment.

FIG. 28 illustrates a method 700 for casting an article using a thermal insulator coating according to another embodiment. The method 700 generally includes a step 702 of providing a preform or insert, a step 704 of depositing a thermal insulator coating onto a surface of the preform or insert, a step 706 of encapsulating part or all of the preform or insert with a metal cladding, a step 708 of positioning the preform or insert into the mold cavity, a step 710 of depositing a molten material into the mold cavity in contact with the preform surface or insert surface bearing the thermal insulator coating and an optional step 712 of applying pressure to the mold cavity. In the optional step 712, the pressure causes the molten material to solidify and also causes the molten material to melt the metal cladding and infiltrate both the preform and the thermal insulator coating.

Figure 29:
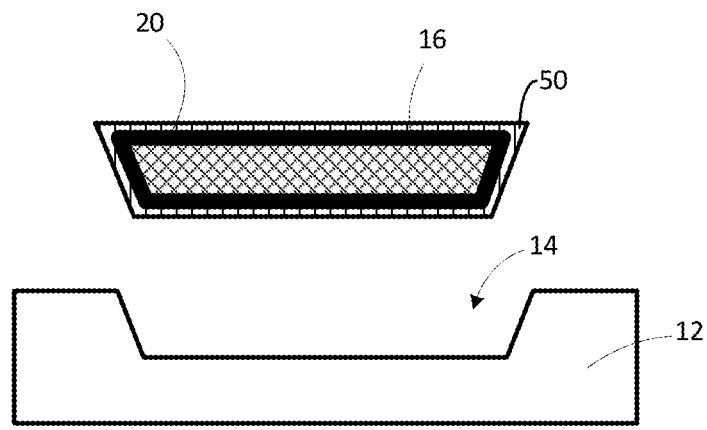
FIG. 29 is a side cross-sectional view of a preform coated with a thermal insulator coating and encapsulated with a metal cladding according to an embodiment.
Figure 30:
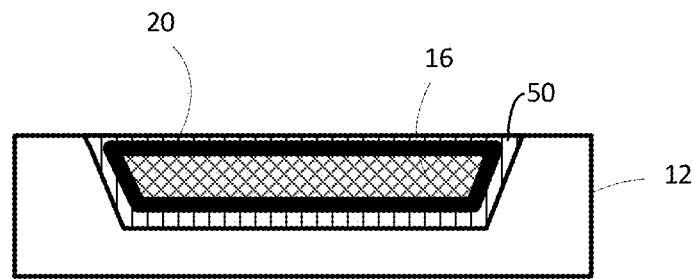
FIG. 30 is a side cross-sectional view of the encapsulated preform and mold cavity of FIG. 29, the encapsulated preform being positioned inside of the mold cavity.

FIGS. 29-30 illustrate a cross-sectional view of a mold cavity during different stages in the method 700. FIG. 29 shows a preform or insert 16, wherein a thermal insulator coating 20 and a metal cladding 50 covers the preform or insert 16. While FIG. 29 shows the thermal insulator coating 20 covering the entire preform or insert 16, skilled artisans will understand that the thermal insulator coating 20 need only cover a portion of the preform or insert 16. Likewise, while FIG. 30 shows the metal cladding 50 covering the entire preform or insert 16, skilled artisans will understand that the metal cladding 50 need only cover a portion of the preform 16 or insert. FIG. 30 shows the mold cavity 14 after the encapsulated preform or insert 16 is deposited therein. In FIGS. 29-30, the mold 12 can also include a top (not shown) that can close or secure the mold cavity 14 during solidification and/or pressurization.

Figure 31:
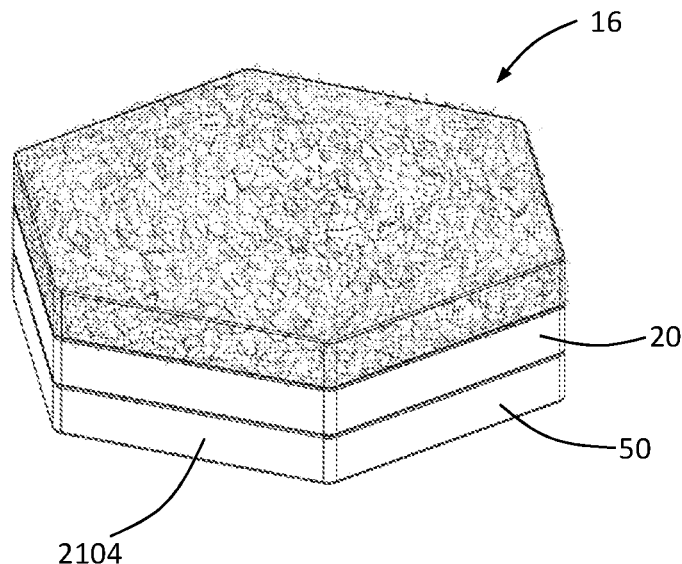
FIG. 31 is perspective view of a preform coated with a thermal insulator coating and partially encapsulated with a metal cladding according to an embodiment.
Figure 32:
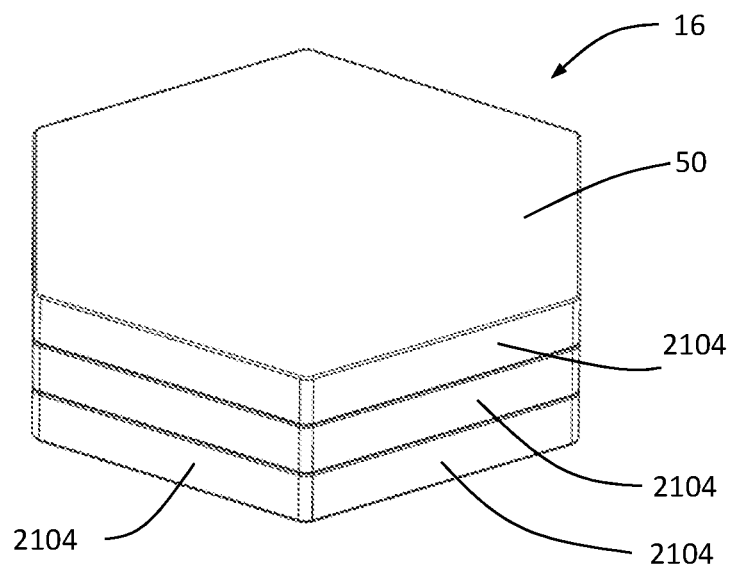
FIG. 32 is perspective view of a preform coated with a thermal insulator coating and fully encapsulated with a metal cladding according to an embodiment.

FIG. 31 shows a preform 16 or insert partially encapsulated and FIG. 32 shows a preform or insert 16 fully encapsulated in a metal cladding. The metal cladding 2104 can be any metal or metal alloy and can be chosen according to compatibility with the molten material and/or according to other desired performance criteria. In some cases, the metal cladding can be aluminum. In other cases, the metal cladding can be stainless steel. The metal cladding can also include any desired thickness. In some cases, the metal cladding has a thickness of about 0.005 inches.

The use of a metal cladding can be desirable for a number of reasons. First, metal cladding can be desirable to simplify handling of a coated preform 16 or insert, such that disruption of the thermal insulator coating can be minimized during handling. The metal cladding can also be desirable to provide protection to the thermal insulator coating that surrounds the preform during casting. For example, in certain casting applications, molten material can move within a mold at a relatively rapid velocity. Such a rapidly moving molten material can erode a thermal insulator coating from a preform or insert as the molten material moves through the mold and across the thermal insulator coating. The metal cladding helps to prevent the thermal insulator coating from immediately eroding. Likewise, molten material can sometimes degrade the preform or insert material itself and the thermal cladding can help to protect this.

According to some embodiments, an encapsulated preform can include a ceramic tile. Coating a ceramic tile with a thermal insulator coating, and providing an encapsulating cladding can help minimize the thermal shock that can result when a molten material comes into contact with the ceramic tile. In some embodiments, a ceramic tile can crack if it is permitted to come into direct contact with a molten material, whereas an insulated and encapsulated ceramic tile may not as easily crack.

In some embodiments, encapsulated preforms can be used with a pressure casting method. One or more encapsulated preforms can be placed within a mold cavity and molten material can then be introduced into the cavity. Pressure can then be applied to the molten material, which causes the metal cladding to soften and eventually melt, permitting the molten material to flow into contact with and infiltrate both the thermal insulator coating and preform.

Figure 33:
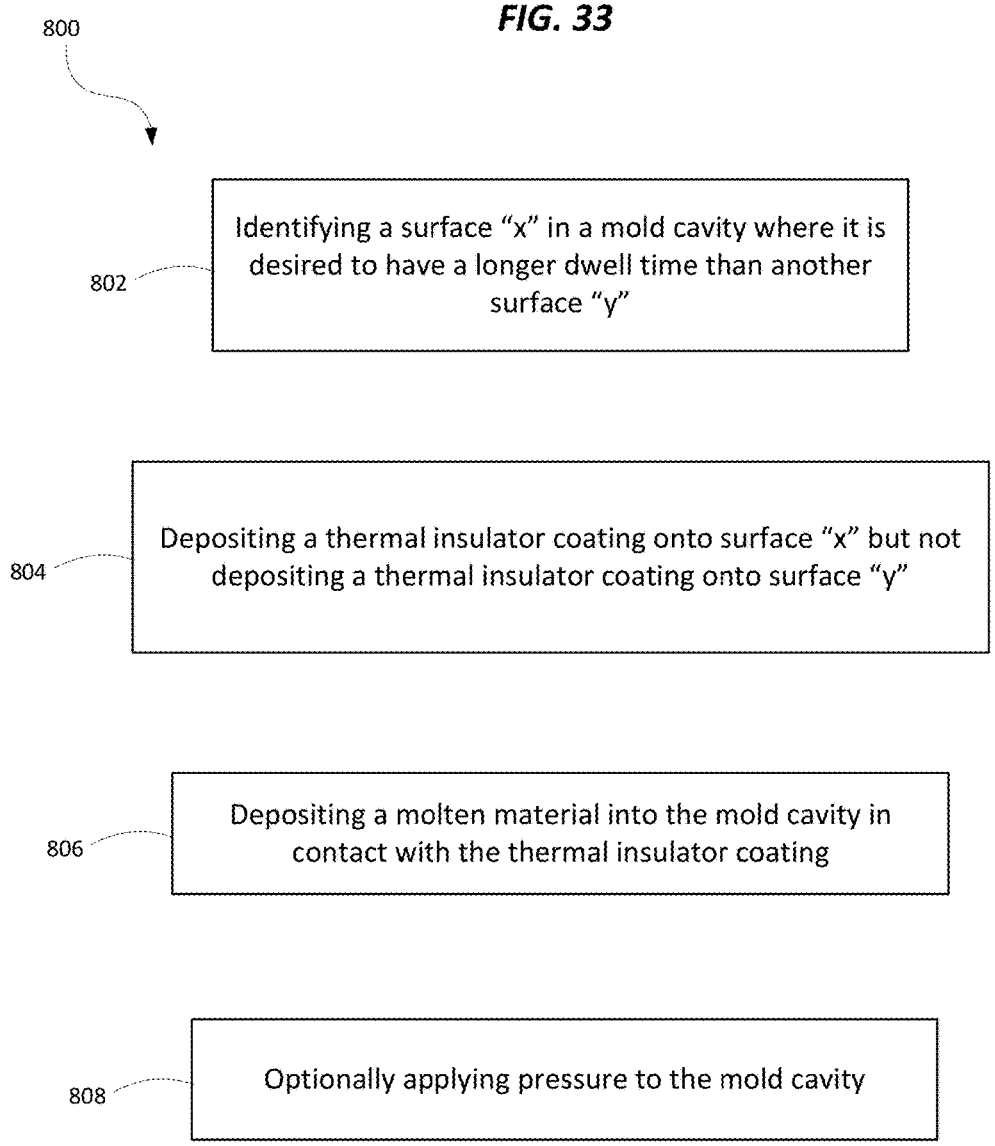
FIG. 33 is a flow diagram illustrating a method for casting an article according to another embodiment.

FIG. 33 illustrates a method 800 for casting an article using a thermal insulator coating according to another embodiment. The method 800 generally includes a step 802 of identifying a surface "x" in a mold cavity where it is desired to have a longer dwell time than another surface "y," a step 804 of depositing a thermal insulator coating onto surface "x" but not spraying a thermal insulator coating onto surface "y," a step 806 of introducing a molten material into the mold cavity in contact with the thermal insulator coating and an optional step 808 of applying pressure to the mold cavity. In the optional step 808, the pressure causes the molten material to solidify and also causes the molten material to infiltrate both the preform and the thermal insulator coating. In the embodiment of method 800, the thermal insulator coating can be deposited on specific surfaces within a mold cavity to provide some measure of control over how, where, and/or when the molten material within the mold cavity meets the mold surfaces after introduction.

Figure 34:
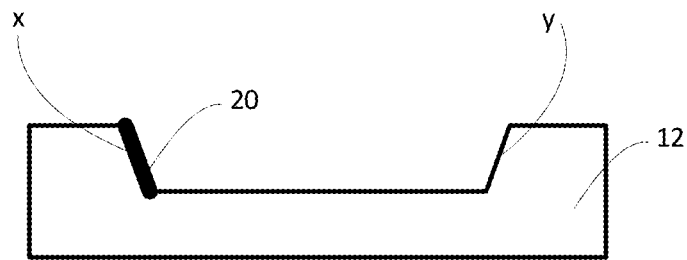
FIG. 34 is a side cross-sectional view of a mold cavity having a surface bearing a thermal insulator coating according to an embodiment.
Figure 35:
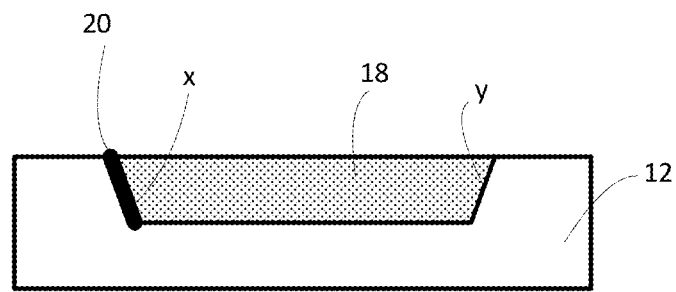
FIG. 35 is a side cross-sectional view of the mold cavity of FIG. 34, the mold cavity having a molten material deposited therein.

FIGS. 34-35 illustrate a cross-sectional view of a mold cavity during different stages in the method 800. FIG. 34 shows a mold cavity having a surface "x" and a surface "y." The surface "x" includes a thermal insulator coating 20. But the surface "y" does not. FIG. 35 shows the mold cavity 14 after the molten material 18 is deposited therein. In FIGS. 34-35, the mold 12 can also include a top (not shown) that can close or secure the mold cavity 14 during solidification and/or pressurization.

Figure 36:
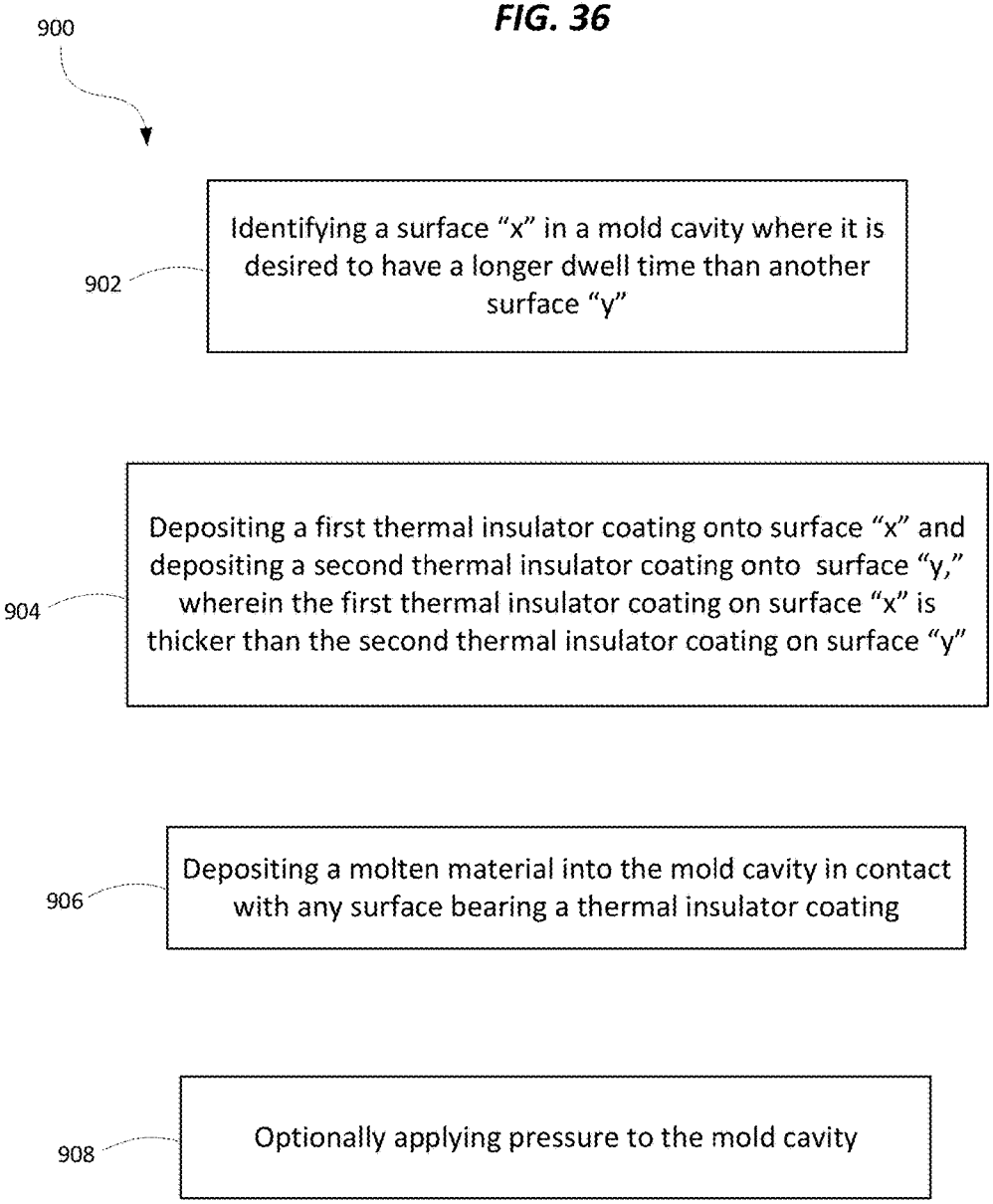
FIG. 36 is a flow diagram illustrating a method for casting an article according to another embodiment.

FIG. 36 illustrates a method 900 for casting an article using a thermal insulator coating according to another embodiment. The method 900 generally includes a step 902 of identifying a surface "x" in a mold cavity where it is desired to have a longer dwell time than another surface "y," a step 904 of depositing a first thermal insulator coating onto surface "x" and depositing a second thermal insulator coating onto surface "y," a step 906 of introducing a molten material into the mold cavity in contact with any surface bearing a thermal insulator coating and an optional step 908 of applying pressure to the mold cavity. In the step 904, the first thermal insulator coating on surface "x" is thicker than the second thermal insulator coating on surface "y." In the optional step 908, the pressure causes the molten material to solidify and also causes the molten material to infiltrate the thermal insulator coating. In the embodiment of method 900, the thermal insulator coating can be applied with a non-uniform thickness to different surfaces in order to provide a measure of control over how, where, and/or when the molten material within the mold cavity meets the mold surfaces after introduction.

Figure 37:
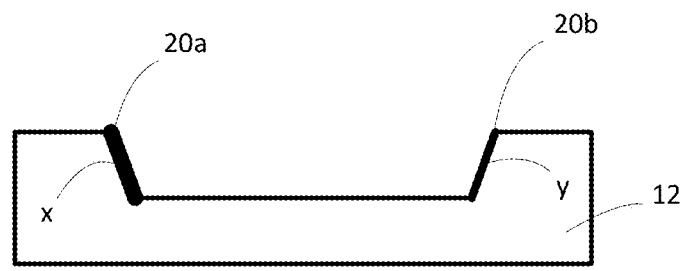
FIG. 37 is a side cross-sectional view of a mold cavity having a first surface bearing a first thermal insulator coating and a second surface bearing a second thermal insulator coating according to an embodiment, wherein the thermal insulator coating on the first surface is thicker than the thermal insulator coating on the second surface.
Figure 38:
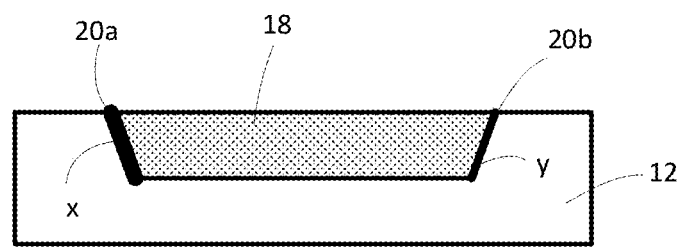
FIG. 38 is a side cross-sectional view of a mold cavity of FIG. 37, the mold cavity having a molten material deposited therein.

FIGS. 37-38 illustrate a cross-sectional view of a mold cavity during different stages in the method 900. FIG. 37 shows a mold cavity having a surface "x" and a surface "y." The mold cavity surface "x" includes a first thermal insulator coating 20a and the surface "y" includes a second thermal insulator coating 20b. FIG. 38 shows the mold cavity 14 after the molten material 18 is deposited therein. In FIGS. 37-38, the mold 12 can also include a top (not shown) that can close or secure the mold cavity 14 during solidification and/or pressurization.

In each of the methods and systems described above, the thermal insulator coating serves to isolate one surface from another surface. In some cases, the thermal insulator coating isolates molten material from an inner surface of a mold cavity. In other cases, the thermal insulator coating isolates molten material from a preform or insert surface.

In some embodiments, the isolation lasts long enough to allow molten material in the mold cavity to remain in a molten state until a specified portion of the mold cavity is filled with molten material. In certain cases, the isolation lasts long enough to allow the molten material in the mold cavity to remain in a molten state until substantially the entire mold cavity is filled with the molten material. In other cases, the isolation lasts long enough to allow the molten material in the mold cavity to contact substantially all surfaces in the mold cavity. In yet other cases, the isolation lasts long enough to allow molten material in the mold cavity to remain in a molten state until a specified pressure is applied to the molten material.

In some embodiments, the thermal insulator coating can be used to help isolate a small space within a mold or a passageway leading into a mold such as a shot sleeve or shot tip. As is known, molten materials injected into a mold through small passageways such as a shot sleeve and shot tip can sometimes solidify while in the small space before the materials even reach the mold cavity. Such premature solidifying can sometimes cause the molten material to build up on the interior surface of the passageway and can sometimes cause partial or complete blocking of the passageway. Thus, in some embodiments, the thermal insulator coating is positioned within a passageway in order to isolate the passageway.

According to some embodiments, the thermal insulator coating can be applied to extend the dwell time of a molten material. In some cases, the dwell time can be on the order of minutes rather than the order of seconds, milliseconds, and smaller units. In some cases, the thermal insulator coating can be applied to extend the dwell time of a molten material to 3, 4, or 5 or more minutes. Such an increased dwell time can provide several advantages. For example, a prolonged or increased dwell time can provide added time that is useful for arranging tiles, inserts, performs, and other types of objects within the mold cavity. With some past methods, multiple people have been needed to insert materials into a mold cavity because of the very quick solidification rates. In contrast, use of the thermal insulator coating may require fewer people and/or provide dwell time for increasing the accuracy of preform positions, ensuring performs are distributed with spacing as desired, etc. This can be useful for casting high performance materials and may make it easier to selectively change the performance of a casting by tailoring properties of the casting during the increased dwell time.

The thermal insulator coating can be applied to have a dried thickness of less than about 0.0625 inches. In some embodiments, the dried thickness can be between about 0.0001 inches and about 0.0625 inches. In some cases, the dried thickness can be chosen to be between about 0.03 inches and about 0.06 inches. According to some embodiments, the dried thickness can be about 0.03 inches. In some embodiments, the dried thickness of a spray-on thermal insulator can range from a trace amount to a thickness of about 0.236 inches (about 6 mm). Accordingly, the thermal insulator coating can be applied at very small thicknesses.

Also, in some embodiments, the thermal insulator coating can be provided at a desired thickness such that it substantially disintegrates at a specified point in the casting process. In some cases, the thermal insulator coating disintegrates when it comes into contact with molten material. In other cases, the thermal insulator coating is sufficiently strong to withstand contact with a molten material but disintegrates after pressure is applied to molten material in the mold. After pressure is applied, the molten material infiltrates the thermal insulator coating and breaks it apart. In many cases, regardless of when the thermal insulator coating disintegrates, when the cast is removed from the mold after casting is completed, the thermal insulator coating is not visible to the naked eye.

Further, in some embodiments, the thermal insulator coating can be applied to control a direction of solidification within the casting. For example, in some cases, a first thermal insulator coating can be applied to an inner surface of the mold cavity. Next, an amount of molten material can be introduced into the mold cavity. After introducing the molten material, a second thermal insulator coating can be applied to a top surface of the molten material. In some cases, one of the first and second thermal insulator coatings is thinner than the other, which may provide control of the direction of solidification. For instance, the thinner coating can break down before the thicker coating does. As such, heat is transferred more readily through the thinner coating, leading to the start of solidification at the thinner coating. Solidification can progress through the molten material until it reaches the thicker coating.

In other embodiments, the thermal insulator coating can be applied to create a functional gradient within a casting. Some types of molten materials include both a molten metal and a particulate material or ceramic fiber material. In some cases, the thermal insulator coating is positioned within the mold such that as the molten material infiltrates the thermal insulator coating, the particulate material or ceramic fiber material tends to have difficulty passing through the thermal insulator coating. Accordingly, a coating or amount of the particulate material or ceramic fiber material tends to build up at the interface of the thermal insulator coating. One example of a molten material that includes a fractional amount of particulates and/or fibers is Duralcan, which is manufactured by Rio Tinto Alcan. For example, in one possible use, the Duralcan material may be 30 vol. fraction as the material is introduced into the mold cavity and may be up to about 60 vol. fraction at the interface of the thermal insulator coating due to the difficulty in passing the particulate matter through the thermal insulator coating. In some cases, the molten material may then tailor back down to about 30 vol. fraction as it nears another side of the mold cavity, thus creating a functional gradient within the molten material.

In some cases, the thermal insulator coating can be applied to provide a casting process in which the mold can be operated at a colder temperature than might otherwise be used. Colder mold temperatures can, in turn, provide faster solidification times which may lead to improved solidification of the molten materials (e.g., finer grains, few long grains, fewer dendrite growths, etc.). In some cases, the methods can be used with a mold cavity having a room temperature (e.g., about 20° C.) as opposed to having a temperature closer to 250° C., which is typical for metal casting processes. Accordingly, some embodiments can provide material flow characteristics within a mold at room temperature that are substantially the same as characteristics typical of molds run at temperatures closer to 250° C., while also providing higher solidification or cooling rates.

Thus, embodiments of the invention are disclosed. Although examples have been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method for casting an article, comprising:
   spray-depositing a thermal insulator coating onto an inside surface of a mold cavity, the spray-depositing comprising spraying a fibrous coating mixture to a thickness of 0.01 to 0.2 inches onto the inside surface of the mold cavity and allowing the fibrous coating mixture to dry, the fibrous coating mixture consisting of ceramic fibers and a liquid and an optional release agent; and
   introducing a molten material into the mold cavity and in contact with the thermal insulator coating, wherein the molten material within the mold cavity remains in a molten state for a predetermined dwell time.

2. The method of claim 1 wherein the predetermined dwell time extends from the introducing the molten material into the mold cavity at least until the molten material fills a specified portion of the mold cavity.

3. The method of claim 2 wherein the predetermined dwell time extends from the introducing the molten material into the mold cavity at least until the molten material fills substantially the entire mold cavity.

4. The method of claim 3 wherein the predetermined dwell time extends from the introducing the molten material into the mold cavity at least until a desired pressure is applied to the molten material.

5. The method of claim 1 further comprising positioning a preform or insert into the mold cavity.

6. The method of claim 5 wherein the preform or the insert has a previously spray-deposited coating of thermal insulating material.

7. The method of claim 6 wherein the preform or the insert has a cladding metal surrounding at least a portion of the previously spray-deposited coating of thermal insulating material.

8. The method of claim 1 wherein the thermal insulator coating is a first thermal insulator coating and the method further comprises spray-depositing a second thermal insulator coating over a surface of the molten material.

9. The method of claim 8 wherein the molten material is a first molten material and the method further comprises depositing a second molten material over a surface of the second thermal insulator coating.

10. The method of claim 9 wherein the method further comprises spray-depositing a third thermal insulator coating over a surface of the second molten material.

11. A method for casting an article, comprising:
    spray-depositing a thermal insulator coating onto a surface of a preform or insert, the spray-depositing comprising spraying a fibrous coating mixture onto the surface of the preform or insert to a thickness of 0.01 to 0.2 inches and allowing the fibrous coating mixture to dry, the fibrous coating mixture consisting of ceramic fibers and a liquid and an optional release agent;
    positioning the preform or insert into a mold cavity; and
    introducing a molten material into the mold cavity and in contact with the thermal insulator coating, wherein the thermal insulator coating isolates the preform or insert from the molten material for a predetermined dwell time.

12. The method of claim 11 wherein the predetermined dwell time extends from the introducing the molten material into the mold cavity at least until the molten material fills a specified portion of the mold cavity.

13. The method of claim 12 wherein the predetermined dwell time extends from the introducing the molten material into the mold cavity at least until the molten material fills substantially the entire mold cavity.

14. The method of claim 13 wherein the predetermined dwell time extends from the introducing the molten material into the mold cavity at least until a desired pressure is applied to the molten material.

15. The method of claim 11 further comprising encapsulating at least a portion of the preform or the insert after the step of spray-depositing a thermal insulator coating onto a surface of a preform or insert and before the step of positioning the preform or insert into a mold cavity.

16. The method of claim 11 wherein the thermal insulator coating is a first thermal insulator coating and the method further comprises spray-depositing a second thermal insulator coating onto an inside surface of the mold cavity and introducing a molten material into the mold cavity and in contact with both the first thermal insulator coating and the second thermal insulator coating.

17. A method for casting an article, comprising:
identifying an inside surface x of a mold cavity and an inside surface y of the mold cavity, the surface x being a surface desiring to have a longer isolation time from molten material than the surface y;
spray-depositing a first thermal insulator coating onto the surface x to a thickness of 0.01 to 0.2 inches; and
spray-depositing a second thermal insulator coating onto the surface y, wherein the first thermal insulator coating is thicker than the second thermal insulator coating, and wherein spray-depositing the first thermal insulator coating and/or the second thermal insulator coating comprises spraying a fibrous coating mixture onto the surface x and/or the surface y and allowing the fibrous coating mixture to dry;
wherein the fibrous coating mixture consists of ceramic fibers and a liquid and an optional release agent.

18. A method for casting an article, comprising:
spray-depositing a thermal insulator coating onto a surface of a mold cavity; and
introducing a molten material into the mold cavity and in contact with the thermal insulator coating;
wherein the molten material within the mold cavity remains in a molten state for a predetermined dwell time;
wherein the thermal insulator coating is a first thermal insulator coating and the method further comprises spray-depositing a second thermal insulator coating over a surface of the molten material; and
wherein the molten material is a first molten material and the method further comprises depositing a second molten material over a surface of the second thermal insulator coating.

19. The method of claim 18 wherein the method further comprises spray-depositing a third thermal insulator coating over a surface of the second molten material.

* * * * *